US011543092B2

(12) United States Patent
McLaughlin, III et al.

(10) Patent No.: US 11,543,092 B2
(45) Date of Patent: Jan. 3, 2023

(54) CEILING MOUNTED ASSEMBLY FOR ELECTRICAL COMPONENTS

(71) Applicant: ARON Lighting LLC, Conshohocken, PA (US)

(72) Inventors: Robert Edwin McLaughlin, III, Boston, MA (US); Robert Norman Aronchick, Villanova, PA (US); Bryan Paul Aronchick, Havertown, PA (US); Jake Solomon Aronchick, Conshohocken, PA (US)

(73) Assignee: ARON Lighting LLC, Conshohocken, PA (US)

(*) Notice: Subject to any disclaimer, the term of this patent is extended or adjusted under 35 U.S.C. 154(b) by 0 days.

(21) Appl. No.: 17/341,677

(22) Filed: Jun. 8, 2021

(65) Prior Publication Data

US 2021/0381664 A1   Dec. 9, 2021

Related U.S. Application Data

(60) Provisional application No. 63/036,083, filed on Jun. 8, 2020.

(51) Int. Cl.
| F21S 8/02 | (2006.01) |
| E04B 9/00 | (2006.01) |
| F21S 8/04 | (2006.01) |
| F21V 23/00 | (2015.01) |
| H02G 3/08 | (2006.01) |
| F21Y 115/10 | (2016.01) |

(52) U.S. Cl.
CPC ............. *F21S 8/026* (2013.01); *E04B 9/006* (2013.01); *F21S 8/043* (2013.01); *F21V 23/003* (2013.01); *H02G 3/08* (2013.01); *F21Y 2115/10* (2016.08)

(58) Field of Classification Search
CPC ........ F21V 8/026; F21V 23/003; E04B 9/006; E04B 9/067; E04B 9/122; F21S 8/043; H02G 3/08; H02G 3/081; H02G 3/36
See application file for complete search history.

(56) References Cited

U.S. PATENT DOCUMENTS

| 3,078,366 | A |   | 2/1963 | Winkler |
| 3,502,860 | A |   | 3/1970 | Boake et al. |
| 4,646,212 | A | * | 2/1987 | Florence ................. E04B 9/006 |
|           |   |   |        | 362/225 |
| 4,860,180 | A | * | 8/1989 | Degelmann ............. F21V 21/04 |
|           |   |   |        | 362/404 |
| 5,408,363 | A |   | 4/1995 | Kano |
| 5,709,460 | A |   | 1/1998 | Lester |
| 5,777,857 | A |   | 7/1998 | Degelmann |
| 7,392,629 | B1 |  | 7/2008 | Bankston |
| 8,702,264 | B1 |  | 4/2014 | Rashidi |
| 10,798,797 | B1 | * | 10/2020 | Mahaffey ............. H05B 47/115 |
| 10,816,172 | B2 | * | 10/2020 | Jones ..................... F21S 8/026 |

(Continued)

FOREIGN PATENT DOCUMENTS

EP    2650599 A1    10/2013

OTHER PUBLICATIONS

DIY Network, How to Install a Tin Ceiling, Apr. 13, 2015, web page, pertinent pp. 1-6 (Year: 2015).

*Primary Examiner* — Alan B Cariaso
(74) *Attorney, Agent, or Firm* — Duane Morris LLP

(57) ABSTRACT

This disclosure relates to an assembly that is configured to be installed or integrated into a suspended grid ceiling.

17 Claims, 24 Drawing Sheets

(56) References Cited

U.S. PATENT DOCUMENTS

| | | |
|---|---|---|
| 2002/0141181 A1 | 10/2002 | Bailey |
| 2008/0087464 A1 | 4/2008 | Patterson et al. |
| 2010/0315833 A1 | 12/2010 | Holman et al. |
| 2011/0175533 A1 | 7/2011 | Holman et al. |
| 2013/0039047 A1 | 2/2013 | Kim et al. |
| 2013/0294061 A1 | 11/2013 | Sorensen et al. |
| 2013/0301249 A1* | 11/2013 | Ngai ................ E04B 9/241 362/147 |
| 2014/0071665 A1 | 3/2014 | Huang |
| 2015/0138779 A1 | 5/2015 | Livesay et al. |
| 2017/0082253 A1 | 3/2017 | Sorensen et al. |
| 2017/0307188 A1* | 10/2017 | Oudina ............... F21S 8/026 |
| 2018/0202634 A1* | 7/2018 | Farzan ............... F21V 23/001 |
| 2019/0242560 A1* | 8/2019 | McLaughlin, III ... F21V 21/049 |

* cited by examiner

CEILING MOUNTED ASSEMBLY FOR ELECTRICAL COMPONENTS

CROSS REFERENCE TO RELATED APPLICATIONS

This application is claims benefit of U.S. Provisional Patent Application No. 63/036,083, filed Jun. 8, 2020, the entirety of which is incorporated by reference herein.

BACKGROUND

Many architectural commercial spaces feature grid ceiling systems. These systems are made up of a plurality of members arranged in a grid pattern. The members are often t-shaped, having a vertical portion and a horizontal portion. This grid or T-bar system is suspended from a ceiling to create a finished look. Any piping, wiring, etc. can be hidden above this "drop" ceiling. When integrated into a drop ceiling, electrical components such as speakers and "downlight" or "directional" luminaires are typically installed in the middle of the panels within this grid system.

SUMMARY

In one or more embodiments, an assembly includes a base plate and a first accessory housing coupled to the base plate. In one or more cases, the first accessory housing defines a chamber to receive an accessory insert therein. In one or more cases, the first accessory housing includes a first end adjacent the base plate and a second end spaced apart from the first end, In one or more cases, a first wall and second wall of the chamber extend between the first end and the second end. In one or more cases, the second end defines an opening of the chamber to receive the accessory insert. In one or more cases, the assembly is configured to be coupled to a ceiling grid such that the first accessory housing is positioned above horizontal portions of intersecting members of the ceiling grid. In one or more cases, the intersecting members each have a t-shape comprising the horizontal portion and vertical portion extending along a length of the respective member.

In one or more embodiments, a ceiling assembly includes a ceiling grid. In one or more cases, the ceiling grid includes a first member having a vertical portion and a horizontal portion extending along a length of the first member. In one or more cases, the ceiling grid includes a second member having a vertical portion and a horizontal portion extending along a length of the second member. In one or embodiments, the ceiling assembly includes an accessory assembly including a base plate and a first accessory housing coupled to the base plate. In one or more cases, the first accessory housing defines a chamber to receive an accessory insert therein. In one or more cases, the first accessory housing includes a first end adjacent the base plate and a second end spaced apart from the first end. In one or more cases, a first wall and second wall of the chamber extends between the first end and the second end. In one or more cases, the second end defines an opening of the chamber to receive the accessory insert. In one or more embodiments, the ceiling assembly includes at least one ceiling tile supported by the horizontal portions of the first member and the second member and by the second end of the first accessory housing. In one or more cases, the accessory assembly is configured to be coupled to the ceiling grid such that the first accessory housing is positioned above the horizontal portions of the first and second members.

In one or more embodiments, an accessory assembly includes a housing defining a chamber to receive an accessory insert therein. In one or more cases, the housing includes a first wall and a second wall disposed between a first end and a second end. In one or more cases, the second end defines an opening of the chamber to receive the accessory insert. In one or more cases, the second end includes a first mounting arm extending from the first wall and a second mounting arm extending from the second wall. In one or more cases, the first mounting arm and the second mounting arm are each shaped to couple to vertical portions of respective members of a ceiling grid.

DETAILED DESCRIPTION

Figure 1:
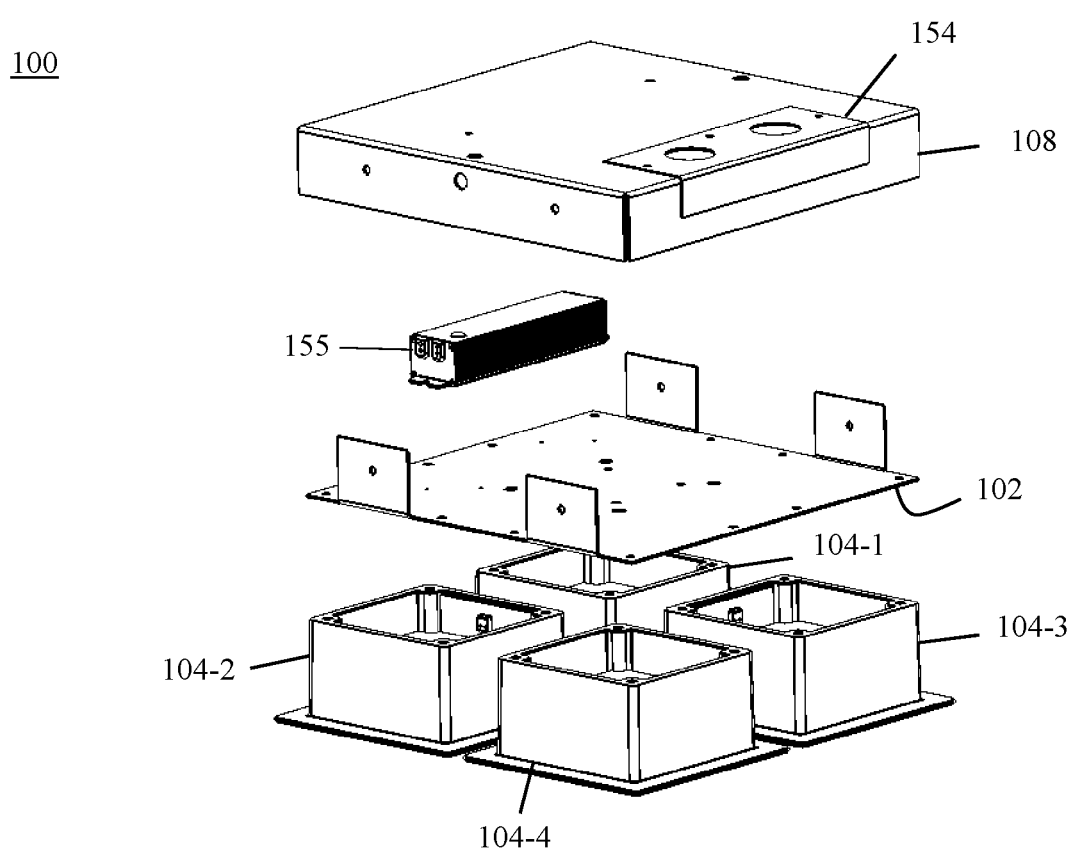
FIG. 1 shows an exploded perspective view of an assembly.
Figure 2:
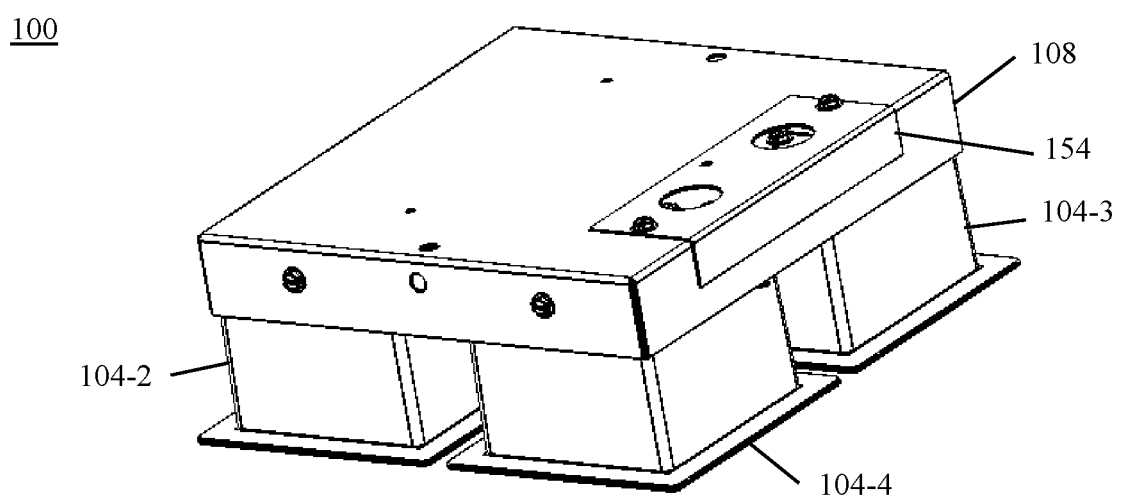
FIG. 2 shows a perspective view of the assembly of FIG. 1.

This description of preferred embodiments is intended to be read in connection with the accompanying drawings, which are to be considered part of the entire written description of this disclosure. The drawing figures are not necessarily to scale and certain features may be shown exaggerated in scale or in somewhat schematic form in the interest of clarity and conciseness. In the description, relative terms such as "horizontal," "vertical," "up," "down," "top," and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "coupled," "connected" and "interconnected," refer to a relationship wherein structures are secured or attached to one another either directly or indirectly through intervening structures, as well as both movable or rigid attachments or relationships, unless expressly described otherwise. The term "operatively or operably connected" or "operatively coupled" or "operably coupled" is such an attachment, coupling or connection that allows the pertinent structures to operate as intended by virtue of that relationship. In the claims, means-plus-function clauses, if used, are intended to cover the structures described, suggested, or rendered obvious by the written description or drawings for performing the recited function, including not only structural equivalents but also equivalent structures.

As used herein, use of a singular article such as "a," "an" and "the" is not intended to exclude pluralities of the article's object unless the context clearly and unambiguously dictates otherwise.

Described in this disclosure is an assembly that is configured to be installed or integrated into a suspended grid ceiling. In embodiments, the assembly has a base plate that mounts above the intersection of a T-bar grid ceiling. The assembly includes one or more modules that extend down from the base plate. Each of the modules is positioned in one quadrant of the intersection defined by the cross-members of the ceiling grid. The assemblies described herein provide a modular system that is easy to install and can be configured to meet the needs of a specific installation. Furthermore, the assemblies described herein provide an appearance that the modules are integrated into the ceiling grid. The modules of the assemblies can include LED lights, speakers, sensors, or other electronic devices. The arrangement of the assemblies allows these devices to be easily integrated into the ceiling of a T-bar ceiling grid.

In one or more embodiments, as shown in FIG. 1, an assembly 100 includes a base plate 102 and at least one module 104 (e.g., four modules 104-1, 104-2, 104-3 and 104-4). When assembled, each module 104 is independently coupled to a module attachment element 106 of the base plate 102, as will be described further herein with reference to FIG. 5. The assembly 100 may further include a cover 108.

Figure 3:
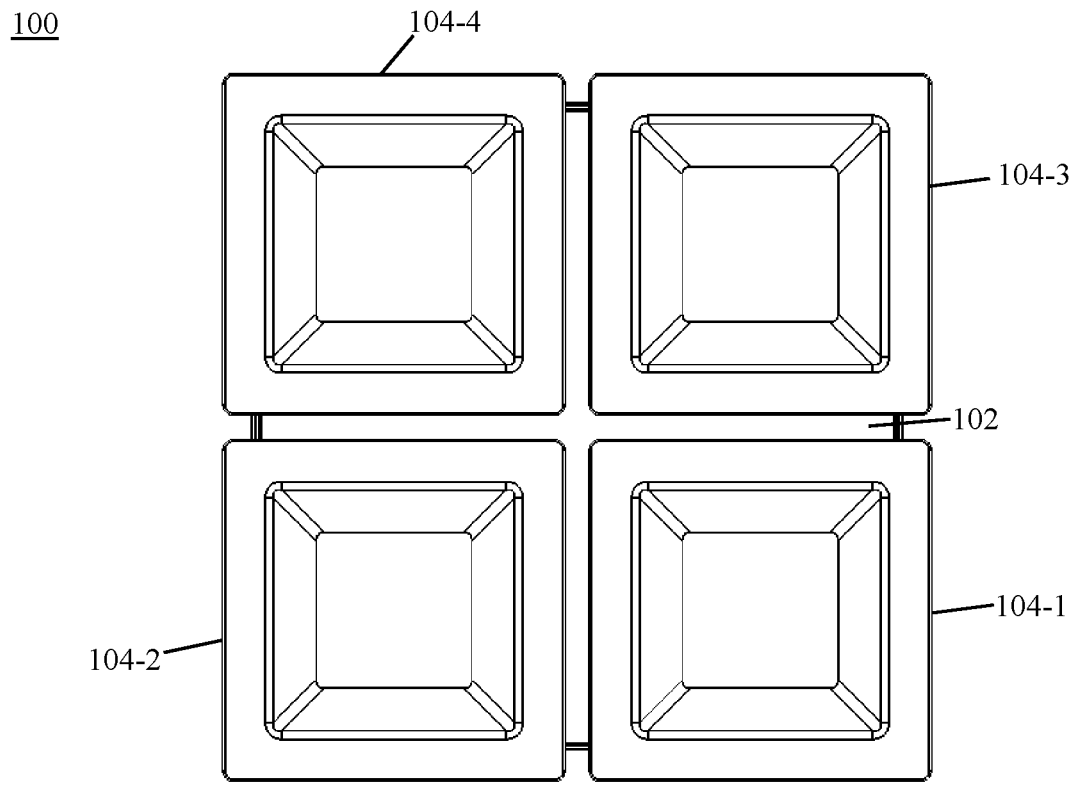
FIG. 3 shows a bottom view of the assembly of FIG. 1, with four modules.
Figure 4:
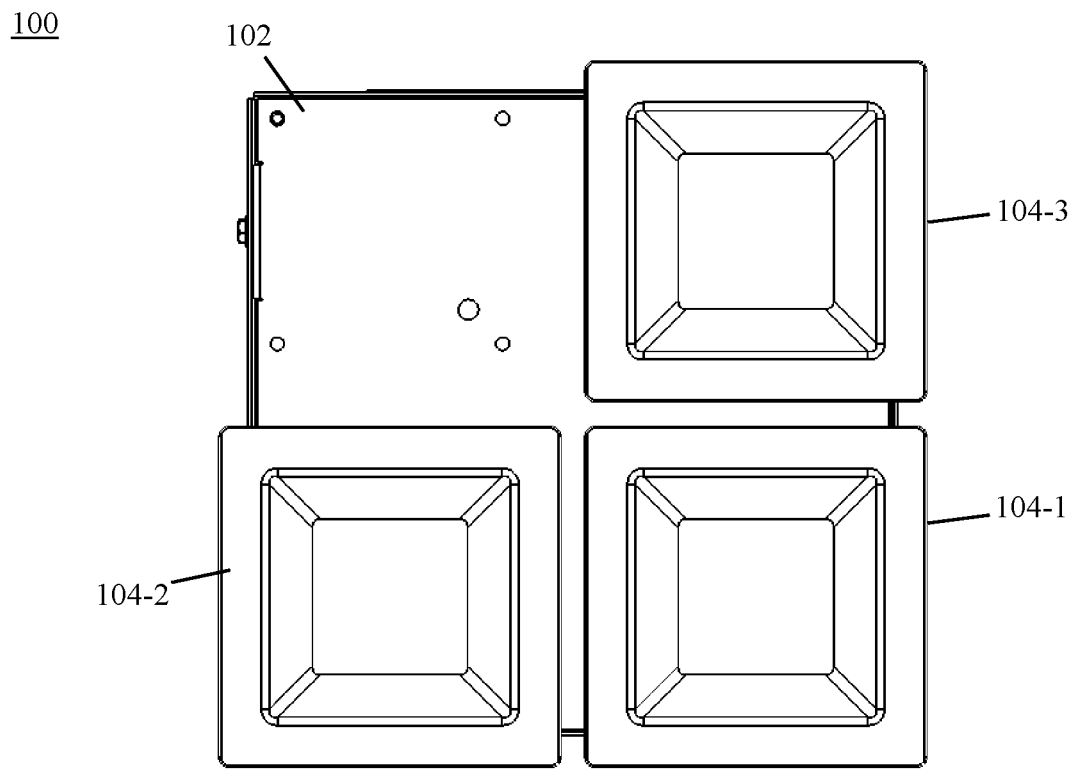
FIG. 4 shows a bottom view of the assembly of FIG. 1, with three modules.

The assembly 100 may include any number of modules 104. As shown in FIG. 3, in one or more embodiments, the assembly 100 includes four modules 104 arranged in a 2×2 grid. This allows the modules 104 to be positioned such that they are on opposite sides of members of a ceiling grid, as will be described further herein. A module 104 may be attached to all or fewer than all of the attachment elements 106. For example, as shown in FIG. 4, the assembly 100 may include only three modules 104. The assembly 100 may also include one module 104 (as shown for example in FIGS. 31 and 32) or two modules 104. The modules 104 can be positioned in any arrangement. This allows for the customization of the assembly 100 to meet the needs of the specific installation. It should be noted that assembly 100 includes attachment elements 106 to accommodate four modules 104 arranged in a 2×2 grid; however, it should also be noted that the assembly 100 may include a plurality of attachment elements 106 to accommodate any number of modules 104. For instance, the assembly 100 includes sixteen attachment elements 106 arranged in a 4×4 grid to accommodate sixteen modules 104, or the assembly 100 includes six attachment elements 106 arranged in a 2×3 grid to accommodate six modules 104.

Figure 5:
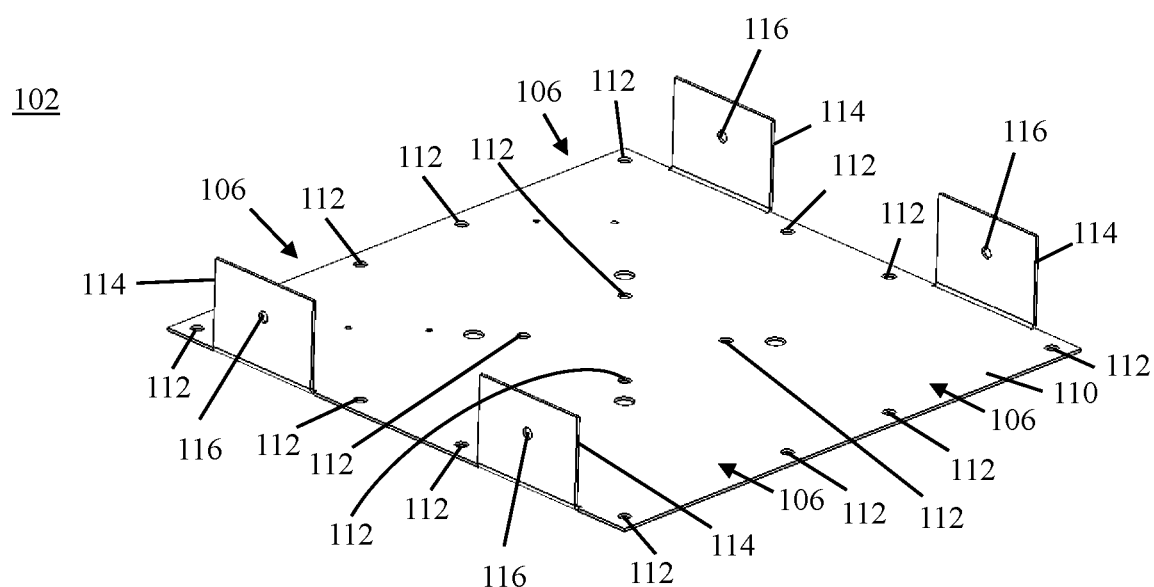
FIG. 5 shows a perspective view of a base plate.

The base plate 102 is shown in more detail in FIG. 5. In one or more embodiments, the base plate 102 includes a primary portion 110 that is in the form of a generally rigid flat plate. The primary portion 110 includes one or more attachment elements 106. The attachment elements 106 may be any design appropriate for coupling the modules 104 to the base plate 102. In one or more embodiments, each attachment element 106 includes through holes 112, for example, but not limited to four through holes, that are configured to receive screws, bolts, or the like therein to couple the base plate 102 to a mating screw recess (e.g., bore 136 shown in FIG. 7) in a module 104, as will be described in more detail herein. It should be understood that each attachment element 106 may include any number of through holes 112. For instance, each attachment element 106 may include the same number of through holes 112 as there are mating screw recesses in a module 104, in which the through holes 112 are aligned with a respective mating screw recess in the module 104. In other embodiments (not shown), the attachment elements 106 include clips for engaging openings in the module 104. In other embodiments (not shown), the attachment elements 106 include openings for receiving clips on the module 104.

The base plate 102 may also include one or more upward extending tabs 114. The upward extending tabs 114 are configured for coupling the base plate 102 to the cover 108, as will be described in more detail herein. The upward extending tabs 114 may include one or more holes 116 for coupling the base plate 102 to the cover 108. The base plate 102 may be constructed of any appropriate material. For example, the base plate 102 is constructed of metal, such as aluminum steel, or the like.

Figure 6:
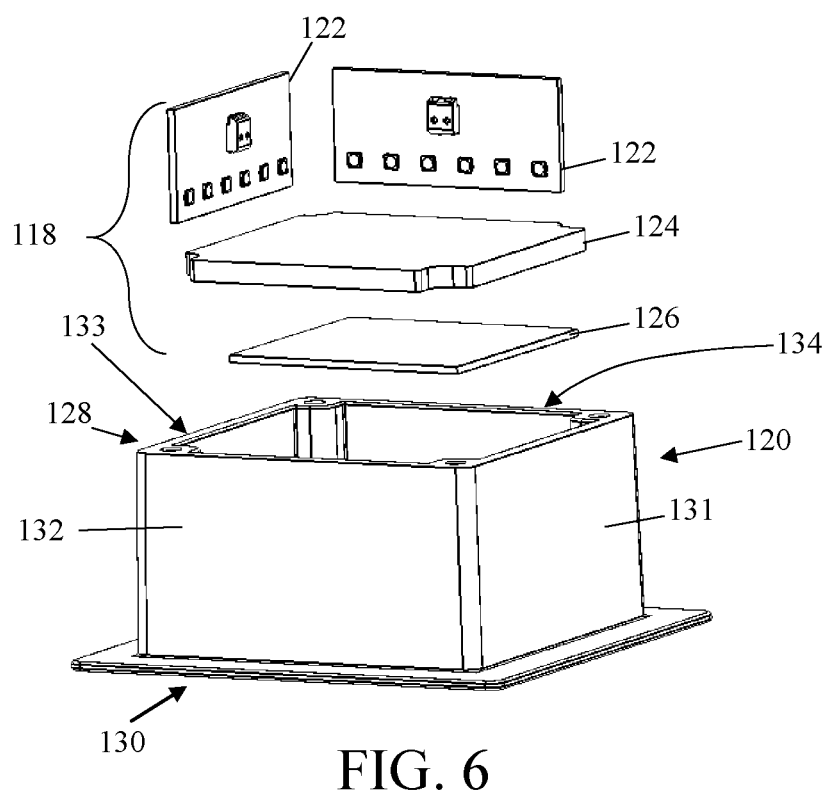
FIG. 6 shows an exploded perspective view of a module.

As shown in the exploded view of FIG. 6, one or more of the modules 104 can include a light source 118 and a housing 120 supporting the light source 118. The light source 118 may be any appropriate light source. For example, the light source may include one or more incandescent bulbs, fluorescent bulbs, compact fluorescent (CFL) bulbs, or light emitting diodes (LEDs). For example, one or more LEDs may face straight down to shine directly through an optical aperture (a direct-lit system). Alternatively, or additionally, an edge-lit optical system can be used, as described below. In another example, the modules 104 do not include their own light source. Instead, a single light source can be used to illuminate more than one of the modules 104.

In various embodiments, as shown in FIG. 6, a module 104 includes its own, independent edge-lit lighting system. The lighting system includes an LED board 122. The LED board 122 includes a plurality of LEDs that are configured to shine through a light guide 124. In one or more embodiments, the light guide 124 is constructed of acrylic. In one or more embodiments, the light guide 124 is about 4.5 millimeters (mm) thick. A reflector (e.g., reflector 127 shown in FIG. 8B) may be positioned behind the light guide 124. The light source 118 may further include a diffuser 126 to diffuse the light emitted from the light source 118. The diffuser 126 can be flat, formed, or have an angled shape.

Figure 7:
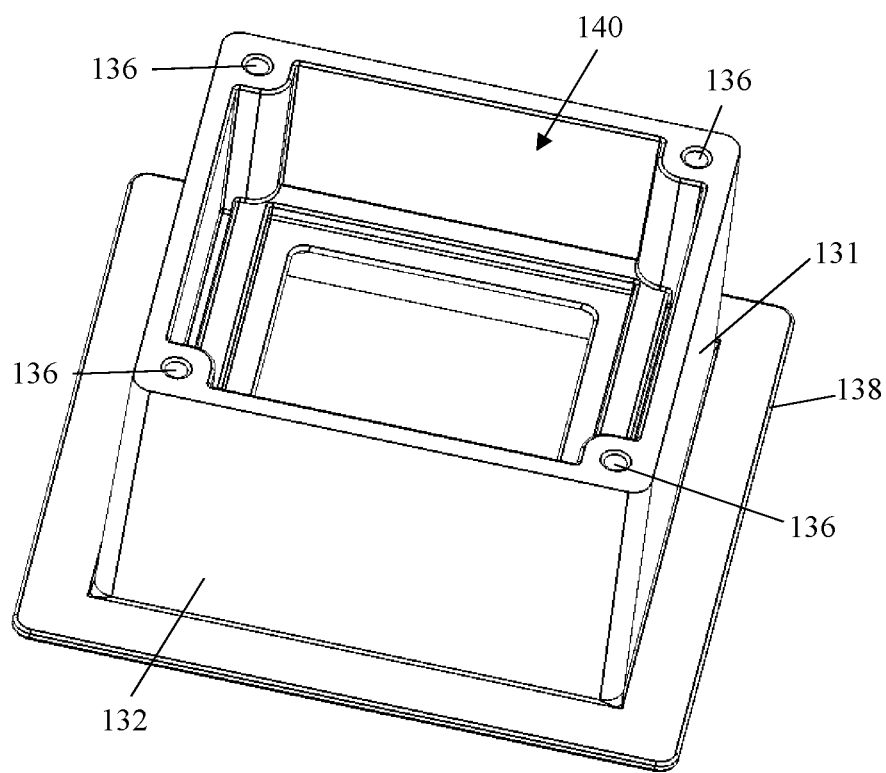
FIG. 7 shows a perspective view of a module housing.

As shown in FIGS. 6 and 7, the housing 120 has a first end 128 that, when assembled, is adjacent to the base plate 102, as shown in FIG. 1. The housing 120 also has a second end 130 disposed opposite and spaced apart from the first end 128. A first face 131, a second face 132, a third face 133, and a fourth face 134 extend from the first end 128 toward the second end 130. In one or more embodiments, when assembled to the base plate 102, the faces 131-134 are substantially perpendicular to the primary portion 110 of the base plate 102. In other embodiments, the faces 131-134 may extend at an angle with respect to the base plate 102. The housing 120 may be configured such that the distance between the first end 128 and the second end 130 is approximately the same as the height of a T-bar ceiling grid member. For example, the distance between the first end 128 and the second end 130 is between about 40 mm and 50 mm. In one embodiment, the distance between the first end 128 and the second end 130 is about 45 mm. The housing 120 can have various geometries—for example the square shape shown in FIG. 7 or the quarter-round shape shown in FIG. 14—without affecting the function of the device.

In various embodiments, at the first end 128 the housing 120 includes one or more bores 136 configured to receive a screw inserted through the through holes 112 in the base plate 102 to couple the module 104 to the base plate 102. The bores 136 may include internal threads to engage the threads of the screw.

In one or more embodiments, the housing 120 includes a flange 138 extending outward at the second end 130. The flange 138 is configured to at least partially support a ceiling tile when the assembly 100 is mounted in a ceiling grid, as will be described further herein. In one or more embodiments, the flange 138 extends outwards from first face 131, the second face 132, the third face 133, and the fourth face 134 of the housing 120 and around the entire perimeter of the housing 120. In other embodiments, the flange 138 extends around less than the entire perimeter of the housing 120, as shown in FIG. 8B. For example, the flange 138 may extend along only two of the sides (e.g., first face 131 and second face 132). The flange 138 can have any appropriate dimensions. For example, the flange 138 extends between about 5 mm and 15 mm from the respective side (e.g., first face 131). In another example, the flange 138 extends about 10 mm from the respective side (e.g., first face 131). In another example, the thickness of the flange 138 is between about 1 mm and about 3 mm. In yet another example, the thickness of the flange is about 2 mm.

Figure 8A:
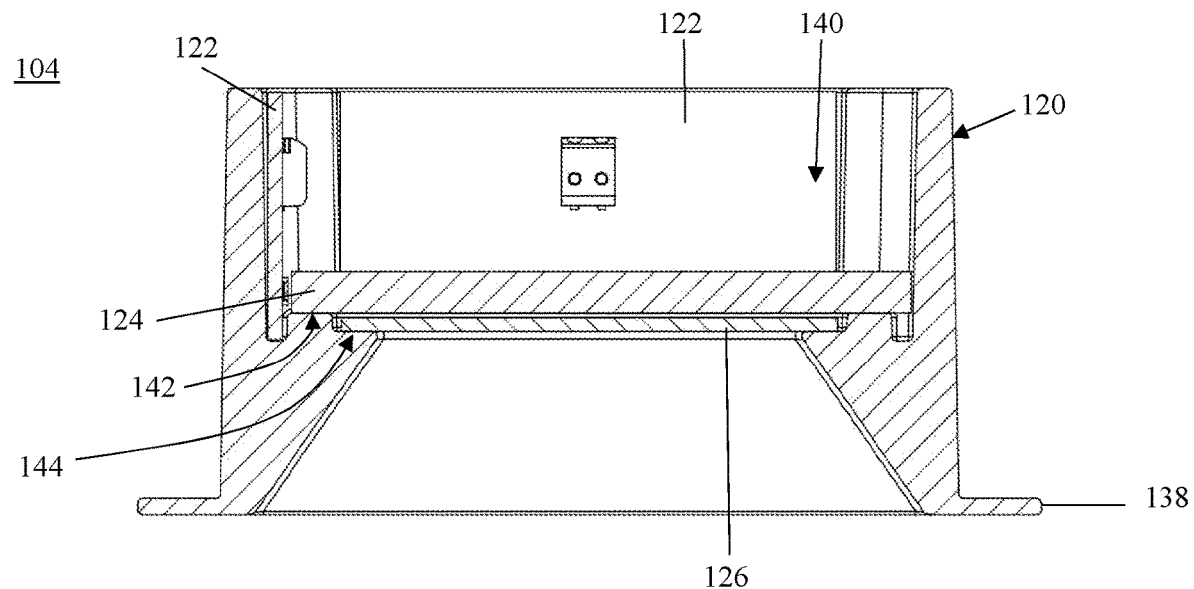
FIG. 8A shows a cross-sectional perspective view of the module of FIG. 6.
Figure 8B:
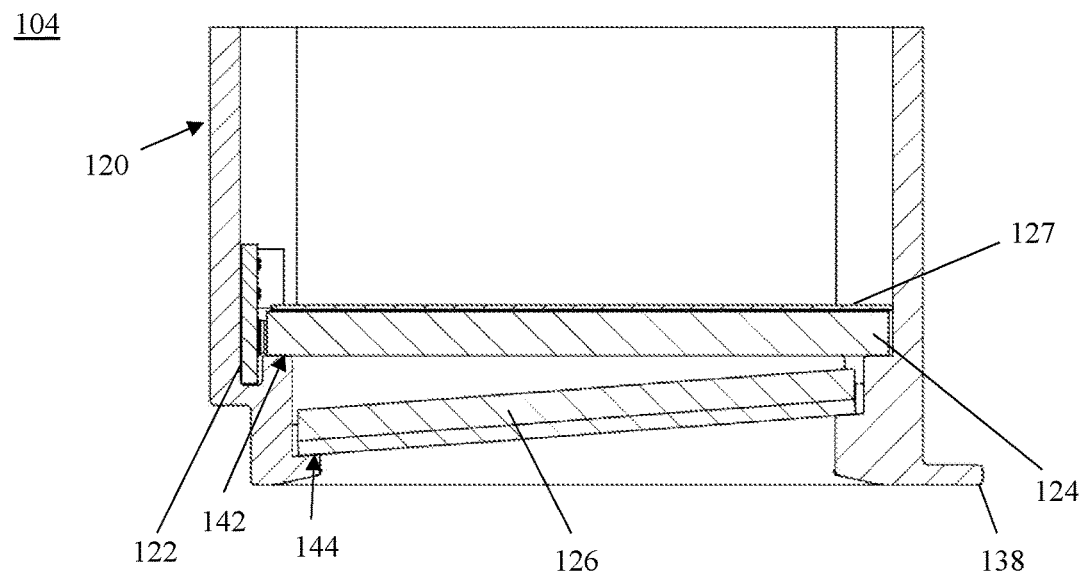
FIG. 8B shows a cross-sectional side view of a module.

As shown in FIG. 8A, the housing 120 includes an internal chamber 140 for housing the light source 118. In one or more embodiments, the housing 120 includes a first lip 142 for supporting the light guide 124. The housing 120 further includes a second lip 144 for supporting the diffuser 126. When assembled, the diffuser 126 rests on the second lip 144 and the light guide 124 rests on the first lip 142. The portion of the internal chamber 140 that is below the second lip 144 (and the diffuser 126) may have any appropriate design to achieve the desired light projection. For example, as shown in FIG. 8A, this portion can extend at a widening angle.

In other various embodiments, shown in FIG. 8B, the second lip 144 is at an angle such that the diffuser 126 sits at an angle within the housing 120 (i.e., the diffuser 126 is not parallel to the flange 138). It should be understood that first lip 142 and second lip 144 need not be continuous and may only extend along a portion of the internal chamber 140.

Figure 9:
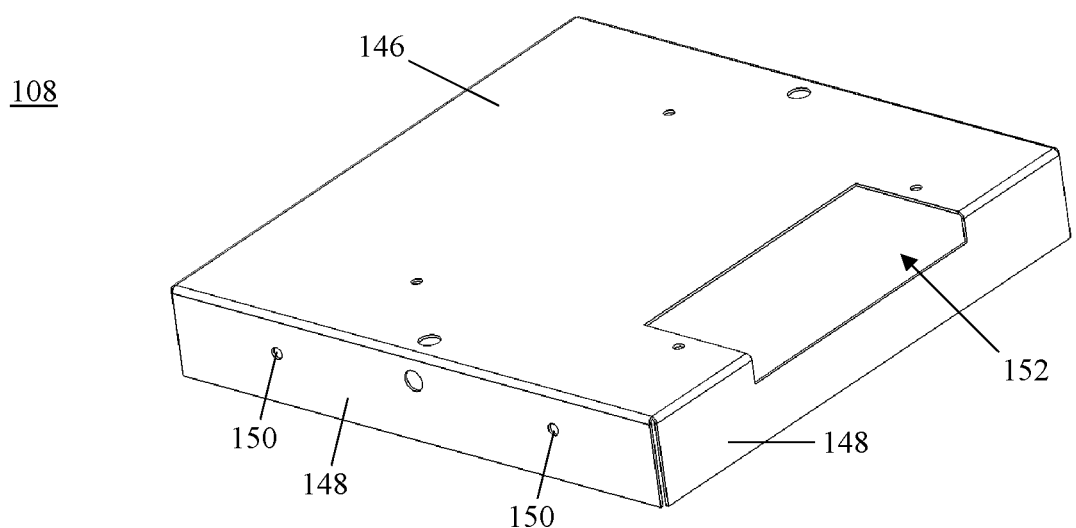
FIG. 9 shows a perspective view of a cover.

FIG. 9 shows the cover 108. The cover 108 includes a generally flat top portion 146 and downward extending sides 148. One or more of the sides 148 may include holes 150 for coupling to the tabs 114 of the base plate 102 (e.g., using screws, bolts, or pins), via the one or more holes 116. The cover 108 may also include a window 152 to allow access to the electrical components housed between the cover 108 and base plate 102 (e.g., LED driver 155). When assembled, the window 152 may be covered by an access plate 154 (shown in FIG. 1).

As shown in FIG. 1, electrical components may be positioned in the space defined between the base plate 102 and the cover 108. For example, the electrical components may include an LED driver 155. The LED driver 155 is electrically coupled to the light source 118 within each module 104. The LED driver 155 is also electrically coupled to a main power source (not shown). The access plate 154 is removably coupled to the cover 108 to allow access to the electrical components for servicing. The cover 108 may also be removably coupled to the base plate 102 to further provide access to the electrical components. Alternatively, in other embodiments (not shown), the electrical components are housed within a separate box positioned adjacent to the base plate 102.

Figure 10:
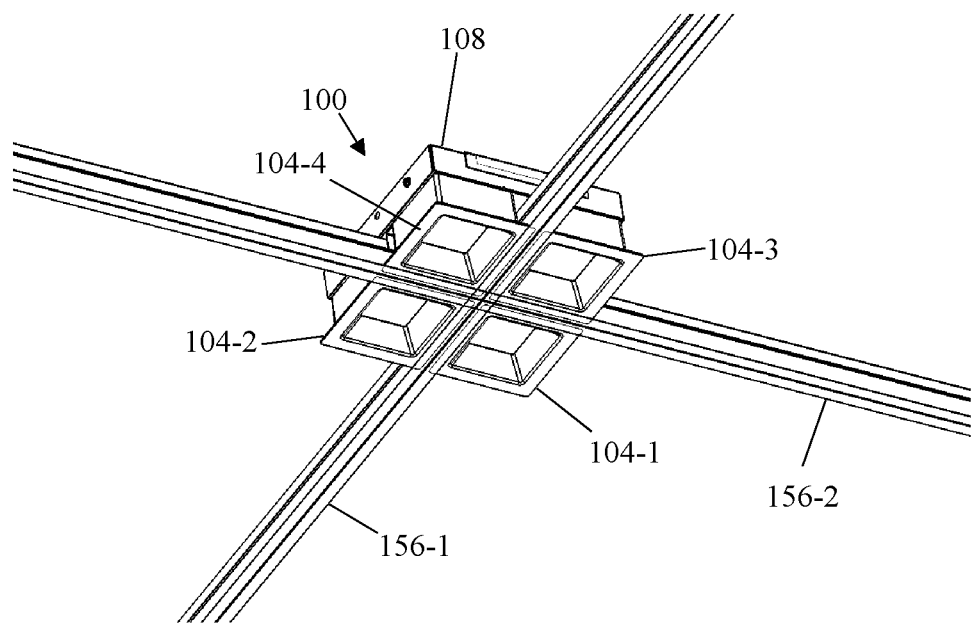
FIG. 10 shows a bottom perspective view of the assembly of FIG. 1 installed in a ceiling grid.
Figure 11:
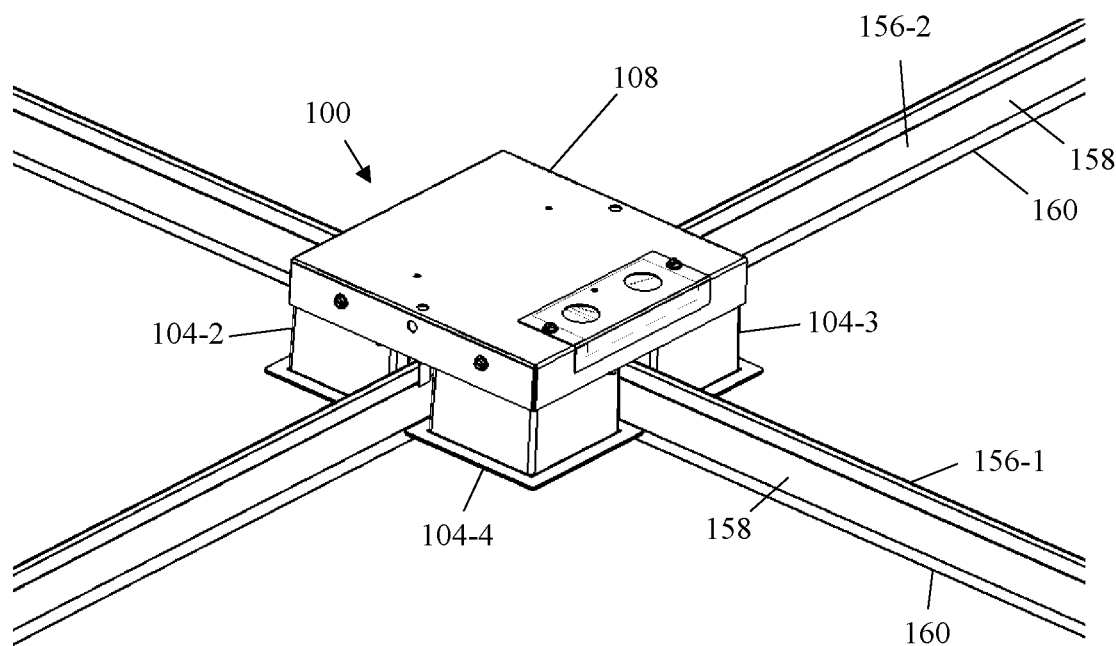
FIG. 11 shows a top perspective view of the assembly of FIG. 1 installed in a ceiling grid.

As shown in FIGS. 10 and 11, the assembly 100 is configured to be coupled to a ceiling grid such that the base plate 102 is mounted above an intersection of a first member 156-1 of the ceiling grid and a second member 156-2 of the ceiling grid. Both the first member 156-1 and the second member 156-2 are t-shaped with a vertical portion 158 and a horizontal portion 160 extending along a length of the respective member. It should be understood that the first member 156-1 and/or the second member 156-2 may be made up of multiple pieces joined together. For example, the second member 156-2 may include a first piece extending from the intersection with the first member 156-1 in a first direction and a second piece extending from the intersection in a second direction.

When coupled to the ceiling grid, the first face 131 and second face 132 of the housing 120 extend downward from the base plate 102 toward the horizontal portions 160 of the first member 156-1 and the second member 156-2. In one or more embodiments, the first face 131 of the housing 120 is configured to be parallel to the vertical portion 158 of the first member 156-1 and the second face 132 of the housing 120 is configured to be parallel to the vertical portion 158 of the second member 156-2.

Figure 18:
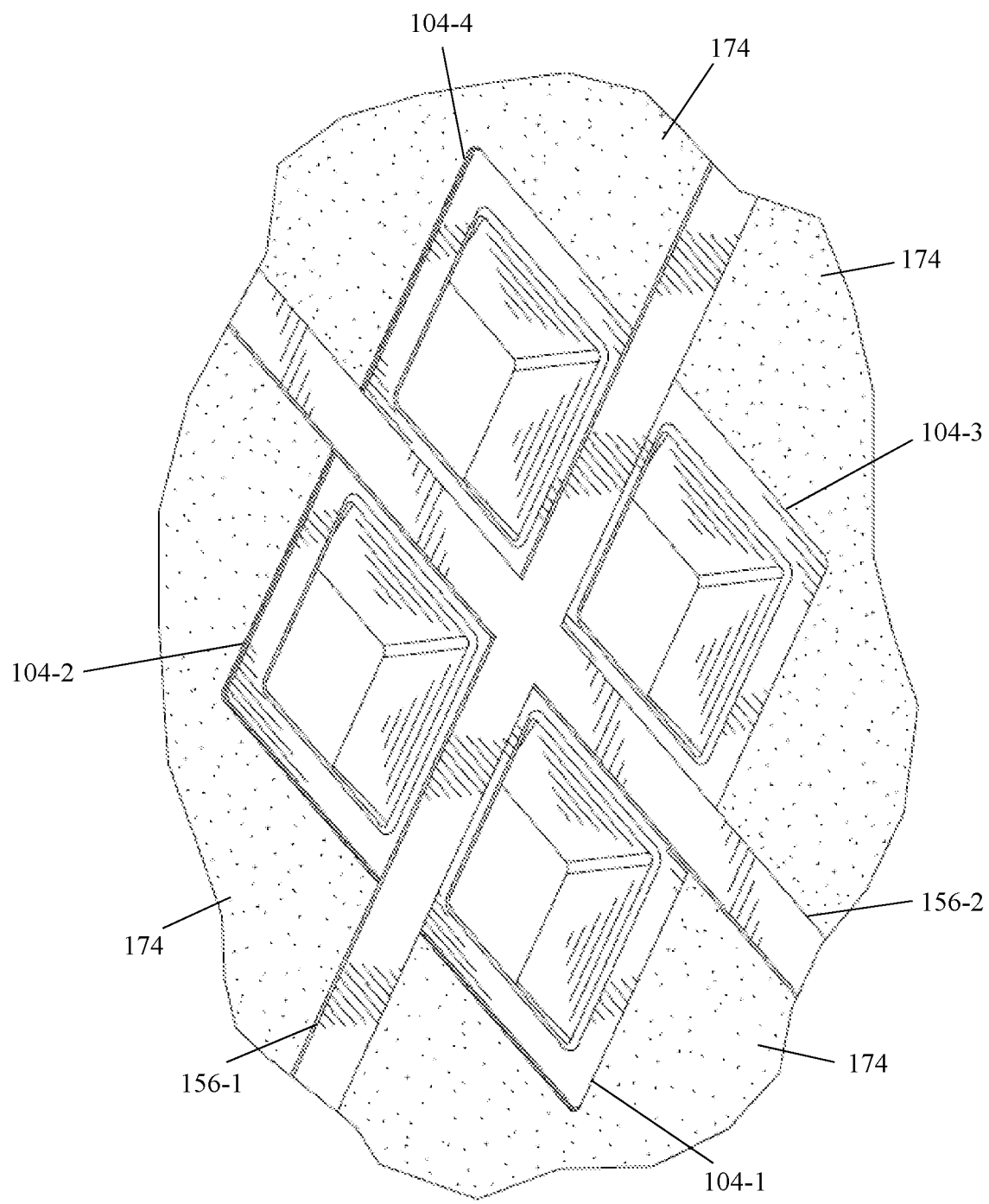
FIG. 18 shows a perspective view of a ceiling assembly including the assembly of FIG. 3.
Figure 31:
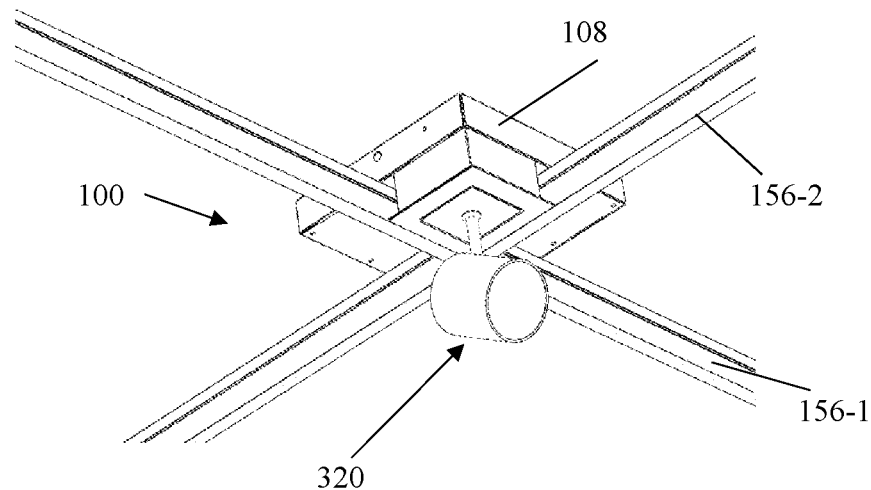
FIG. 31 shows a bottom perspective view of the assembly of FIG. 1 installed in the ceiling grid, in which one module and a spotlight insert are installed.
Figure 32:
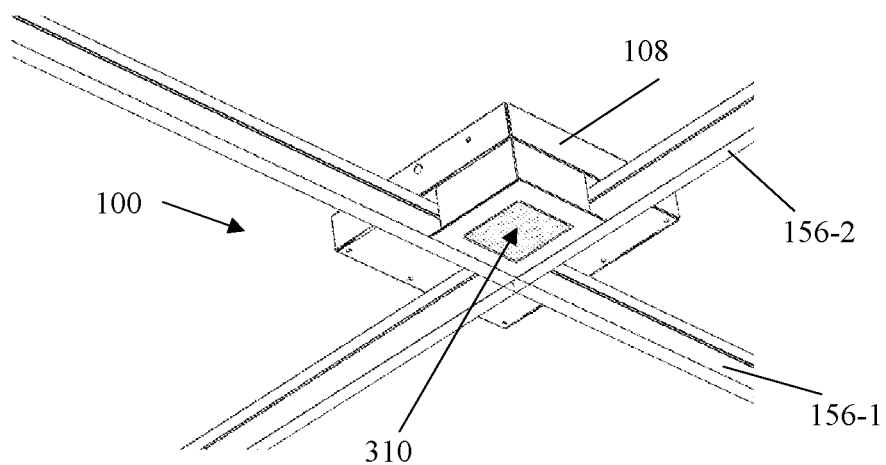
FIG. 32 shows a bottom perspective view of the assembly of FIG. 1 installed in the ceiling grid, in which one module and a speaker insert are installed.

As shown in FIG. 10, each of the modules 104 attached to the base plate 102 is positioned in a respective quadrant of the ceiling grid, where the quadrants are defined by the intersection of the first member 156-1 and the second member 156-2. For example, the first module 104-1 is on a first side of the vertical portion 158 of the first member 156-1 and the second module 104-2 is on an opposite side of the vertical portion 158 of the first member 156-1. Further, the first module 104-1 is on a first side of the vertical portion 158 of the second member 156-2 and the third module 104-3 is on an opposite side of the vertical portion 158 of the second member 156-2. Finally, the fourth module 104-3 is on the opposite side of the vertical portion 158 of both the first member 156-1 and the second member 156-2 from the first module 104-1. It is noted that FIGS. 10, 11, and 18 shown four modules 104 coupled to the base plate 102 and integrated with the ceiling tiles 174, such that the modules 104 are exposed to the room in which the assembly 100 is installed, as described herein. However, it should be noted that any number of modules 104 may be coupled to the base plate 102 and integrated with the ceiling tiles 174. For example, one module 104 may be coupled to the base plate 102 and may house an insert such as speaker insert 310 (as shown in FIG. 32) or spotlight insert 320 (as shown in FIG. 31). Thus, one the ceiling tile 174 corresponding to the area of the ceiling grid housing the one module 104 may be cut to accommodate the module 104, and the remaining ceiling tiles 174 adjacent to and/or diagonal from the cut ceiling tile 174 may be installed in conventional fashion.

Figure 12:
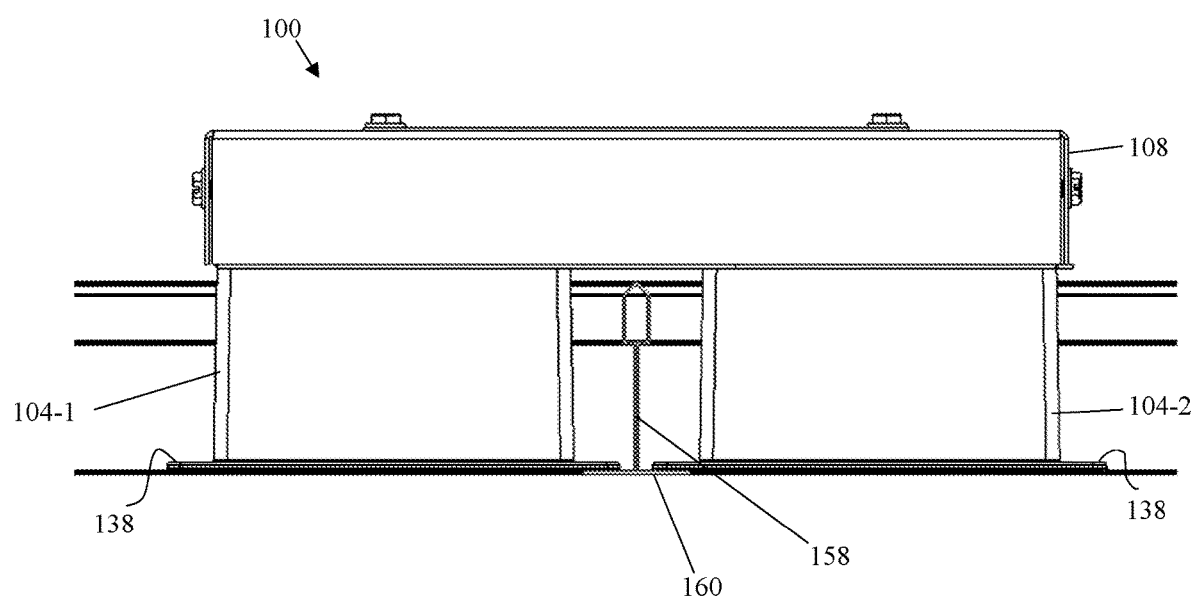
FIG. 12 shows a side view of the assembly of FIG. 1 installed in a ceiling grid.

When installed, the flange 138 of the housing 120 of each module 104 may contact the horizontal portion 160 of one or both of the members 156, as shown in FIG. 12. In other embodiments in which the flange 138 extends around less than the entire perimeter of the housing 120 (as shown in FIG. 8B), the second end 130 of the housing 120 may be flush with the bottom of the members 156.

Figure 13:
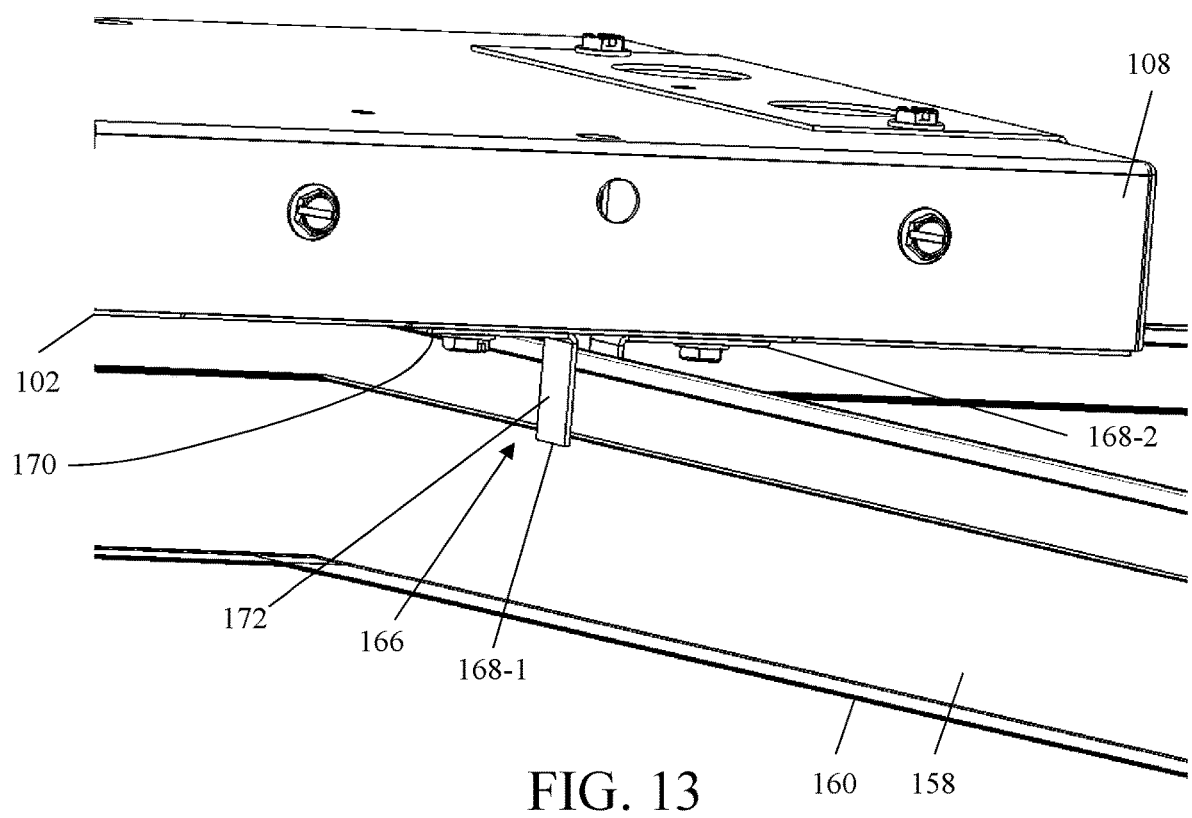
FIG. 13 shows a perspective view of the assembly of FIG. 1 installed in a ceiling grid showing a mounting bracket coupling the assembly to a member of the ceiling grid.

As shown in FIG. 13, the assembly 100 may further include one or more mounting brackets 166 coupled to the base plate 102. Each of the mounting brackets 166 are configured to couple the assembly 100 to the vertical portion 158 of either the first member 156-1 or the second member 156-2 of the ceiling grid. As shown in FIG. 11, in one or more embodiments, the mounting bracket 166 includes a first mounting arm 168-1 and a second mounting arm 168-2. Each of the mounting arms 168 include a first portion 170 coupled to the base plate 102 and a second portion 172 extending downward, away from the base plate 102. When installed in a ceiling grid, the second portions 172 of the respective mounting arms 168 are positioned on opposite sides of the vertical portion 158 of the first member 156-1 of the ceiling grid. Hence, the mounting arms 168 prevent movement of the assembly 100 transverse to the vertical portion 158 of the first member 156-1. Similarly, in an example, a second mounting bracket (not shown) may be provided that includes mounting arms that straddle the vertical portion 158 of the second member 156-2 to prevent motion of the assembly 100 transverse to the vertical portion 158 of the second member 156-2. Hence, in this way, the position of the assembly 100 may be fully defined. Further, in another example, a third mounting bracket (not shown) may be coupled to the base plate 102 and disposed opposite the mounting bracket 166. The third mounting bracket may be coupled to the vertical portion of the first member 156-1 in a similar manner as the mounting bracket 166 is coupled to the first member 156-1. Further in another example, a fourth mounting bracket (not shown) may be coupled to the base plate 102 and disposed opposite the second mounting bracket. The fourth mounting bracket may be coupled to the vertical portion of the second member 156-2 in a similar manner as the mounting bracket 166 is coupled to the second member 156-2.

Turning to FIG. 18, after mounting the assembly 100 to the ceiling grid, ceiling tiles 174 can be mounted in the ceiling grid to form a ceiling assembly. When installed, the ceiling tiles 174 are supported by the horizontal portions 160 of the first member 156-1 and second member 156-2 of the ceiling grid as well as the flange 138 of the housing 120 of the module 104. Hence, as shown in FIG. 18, the modules 104 appear to be integrated into the ceiling grid. Before installation, the ceiling tiles 174 may be cut to accommodate the modules 104, as will be described further herein.

Figure 14:
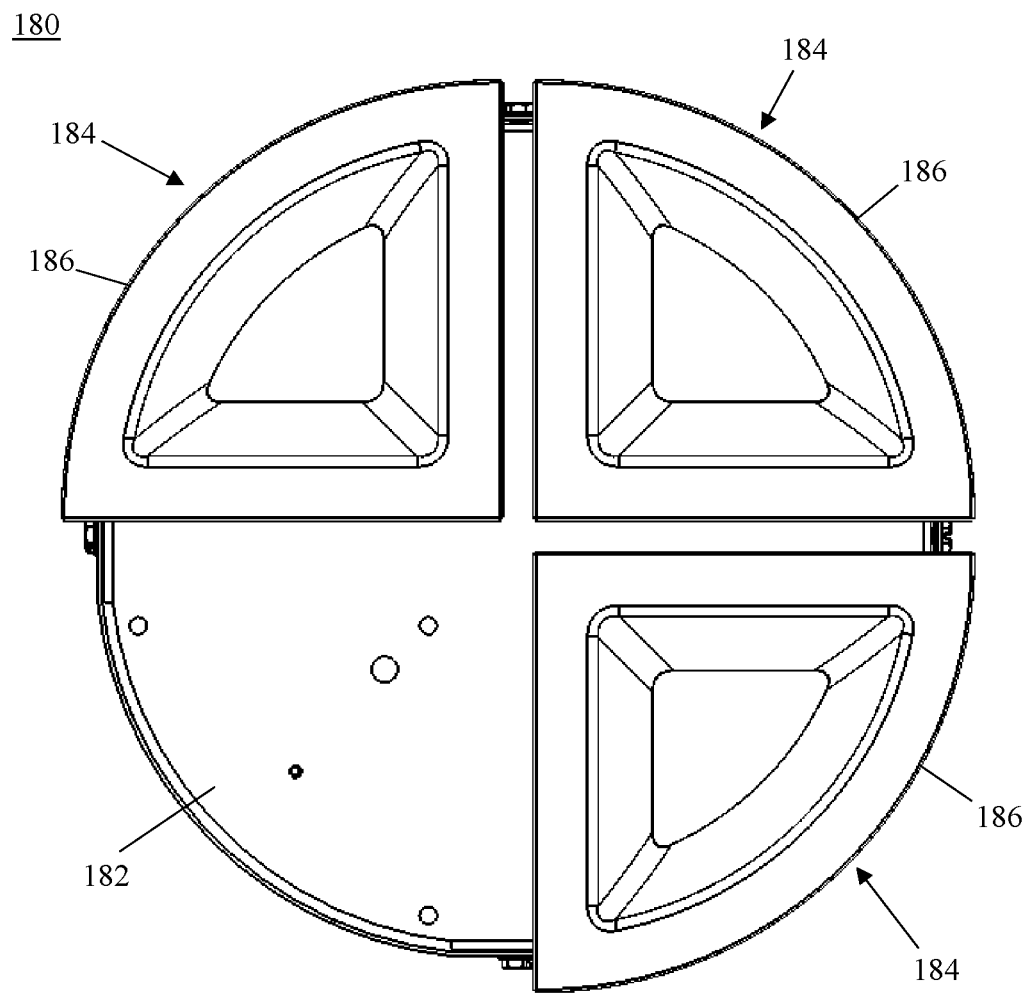
FIG. 14 shows a bottom view of an assembly.

The assembly may be provided in any configuration to achieve a desired aesthetic appearance without changing the function of the assembly. For example, as shown in FIG. 3, the assembly 100 has a generally square configuration. In another example, as shown in FIG. 14, the assembly 180 has a generally round configuration. The assembly 180 may include a generally round base plate 182 and one or more modules 184 having a housing 186 with a quarter round configuration. In one or more cases, the functional aspects of the assembly 180 may be substantially similar to assembly 100 described above.

The assemblies described herein are not limited to housing LEDs and other light sources. For instance, in some embodiments, one or more of the modules 104 of the assembly 100 are configured to receive or house various inserts, and/or a combination of various inserts. For example, the modules 104 can receive inserts that include various electronic devices. For example, the inserts can include sensors, cameras, WiFi enablers or WiFi repeaters, speakers, emergency lighting, and safety devices (e.g., carbon monoxide detectors, smoke detectors, etc.). Because the assembly 100 is configured to be connected to the building's electrical system, power can be supplied to the electronic device without separate wiring. The modularity of being able to install various electronic devices allows contractors an easy way to integrate these devices into the building and to easily customize the configuration of the assembly 100. Further, by integrating the electronic devices into the assemblies described herein, the electronic devices can be mounted adjacent to T-bars of a ceiling grid. Further, the modules can be configured to receive electrical devices from a variety of vendors to provide an additional installation and distribution channel for such vendors. As described herein, the assemblies can be mounted such that the modules sit on a horizontal portion of the T-bar. As also described herein, the modules 104 can be easily attached to the base plate 102 in a desired configuration. This may allow a general contractor or other non-specialist installer to install these components without requiring the assistance of a specialist installer.

Figure 19:
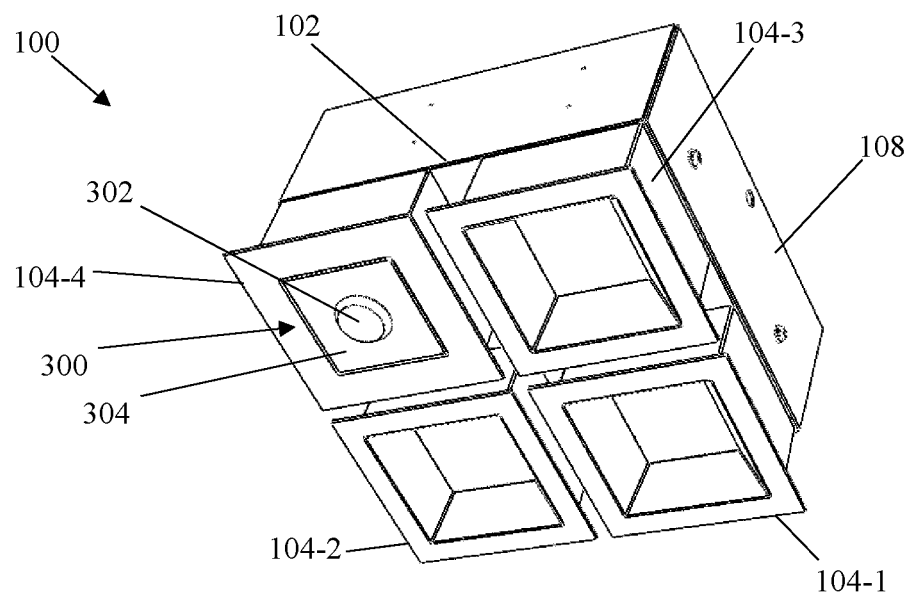
FIG. 19 shows a bottom perspective view of an assembly in which a sensor insert is installed in one of the modules of the assembly.
Figure 20:
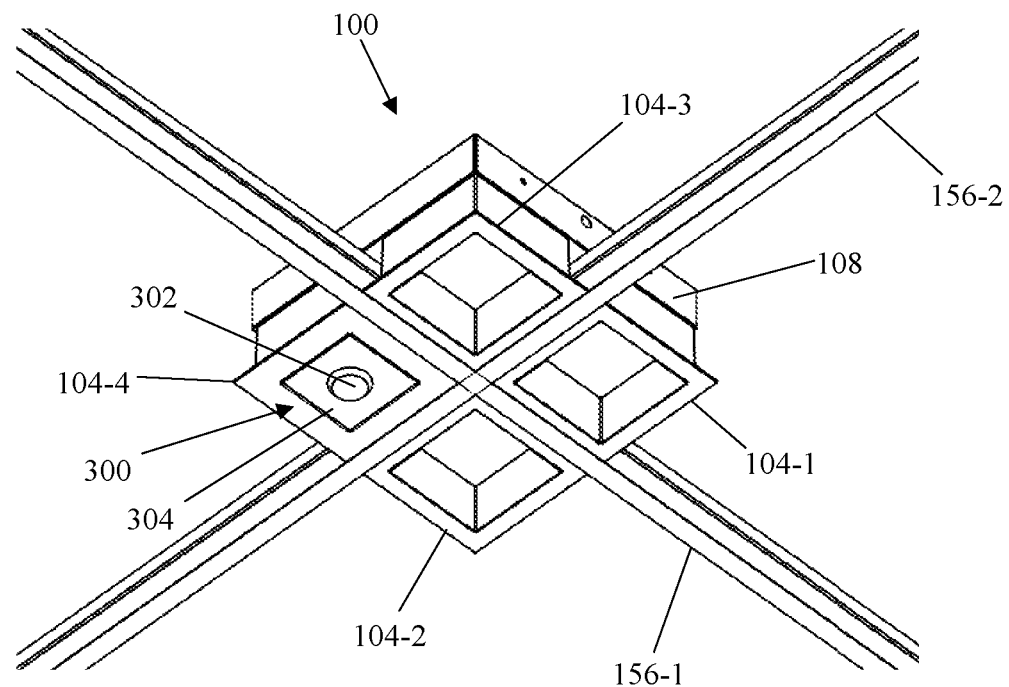
FIG. 20 shows a bottom perspective view of the assembly of FIG. 19 installed in a ceiling grid.

FIG. 19 shows a bottom perspective view of an embodiment of assembly 100. FIG. 20 shows the assembly 100 installed in a ceiling grid having a first member 156-1 and a second member 156-2. As with the embodiments described above, the assembly 100 includes a plurality of modules 104 attached to a base plate 102. At least one of the modules 104 includes a housing 120 defining an internal chamber 140 configured to receive an insert. For example, the module 104-4 includes a sensor insert 300 installed in the internal chamber 140 of the housing 120.

Figure 21:
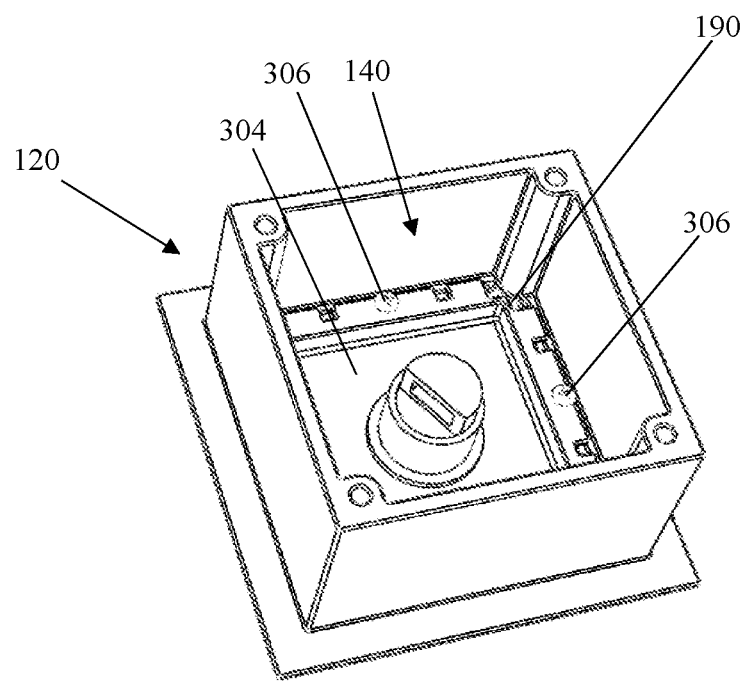
FIG. 21 shows a top perspective view of a sensor insert installed in a module of an assembly.
Figure 22:
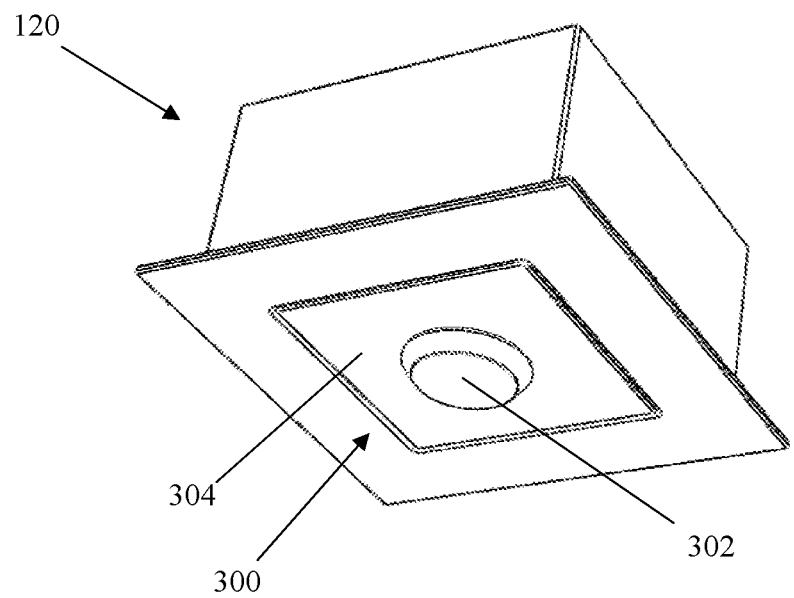
FIG. 22 shows a bottom perspective view of the sensor insert of FIG. 20 installed in a module of an assembly.

FIGS. 21 and 22 show the sensor insert 300 and the module 104-4. The sensor insert 300 includes a sensor 302. The sensor 302 can be, for example, a motion sensor, a smoke detector, a carbon monoxide detector or any other appropriate sensor. The sensor 302 is mounted to a plate 304. In one or more embodiments, the plate 304 is configured to mount to a shoulder 190 extending into the internal chamber 140, for example using screws 306 or other fasteners. In other embodiments, the sensor insert 300 snaps into the housing 120. In one embodiment, the sensor insert 300 is pre-installed in the housing 120. In other embodiments, the sensor insert 300 can be mounted to the housing 120 at the time of installation of the assembly 100 in the ceiling grid.

Figure 33:
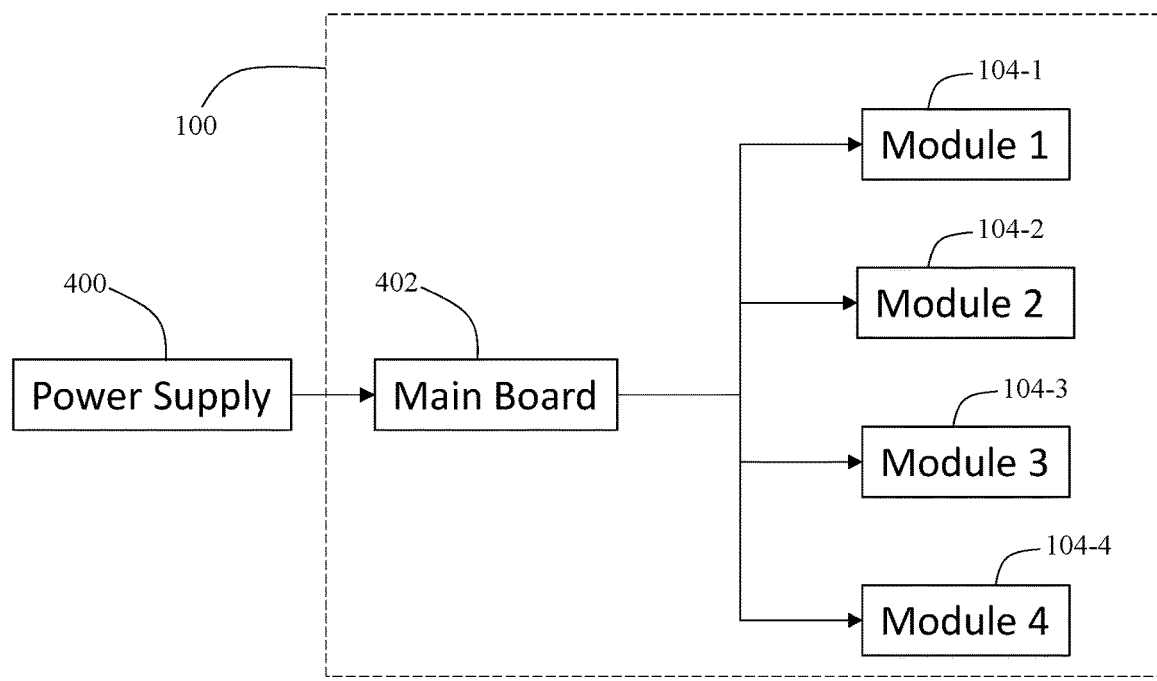
FIG. 33 illustrates an assembly in which each of the modules are connected to the building's power supply via a single channel.
Figure 34:
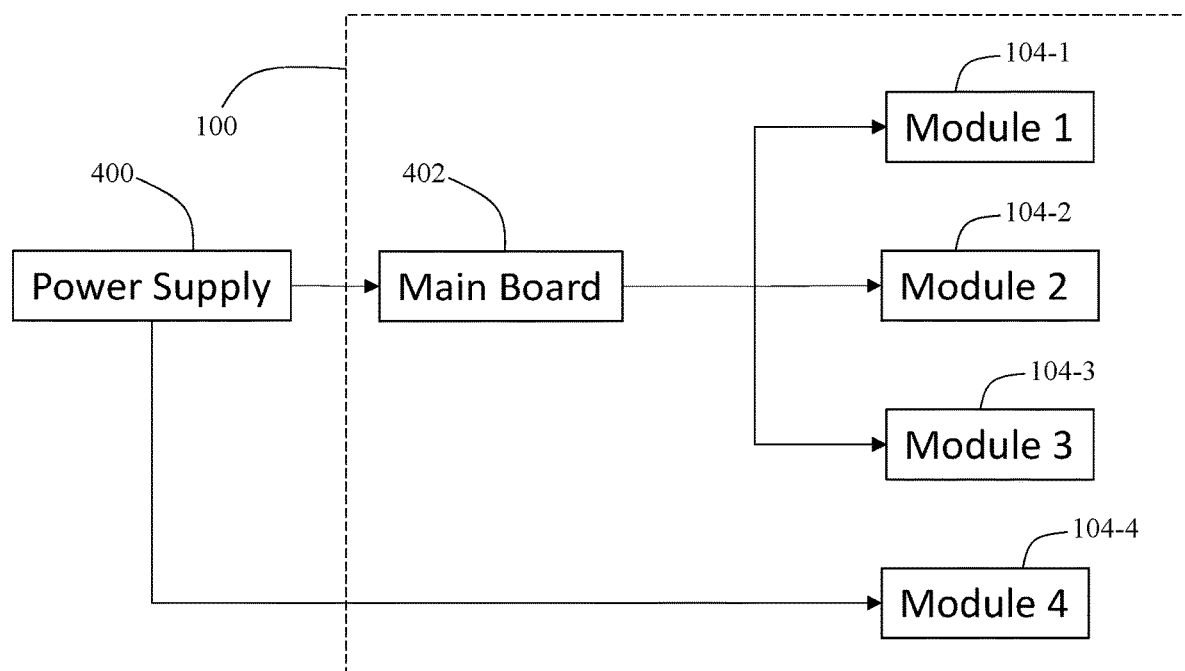
FIG. 34 illustrates an assembly in which at least one module is connected to the building's power supply via a separate channel than the other modules.

The sensor insert 300 can further include wiring and/or other electronic connections to allow the sensor 302 to be electrically coupled to a main board 402 (shown in FIGS. 33 and 34) of the assembly 100 or directly connected to the electrical system of the building. In some embodiments, the sensor insert 300 is pre-connected to the main board 402 of the assembly. In other embodiments, the installer electrically connects the sensor insert 300 to the main board 402 at the time of installation of the assembly 100 in the ceiling grid. In some embodiments, as shown in FIG. 33, the devices in each of the modules 104 are connected to the building's power supply 400 through a single power channel via a main electrical board 402 such that providing power through the single power channel provides power to each of the modules 104. In other embodiments, as illustrated in FIG. 34, one or more modules 104 are connected to the power supply 400 via a separate power channel such that power supply to the modules 104 can be controlled separately. It should be understood that both of the channels from the power supply 400 can be connected to the main board 402 such that the modules 104 can be selectively coupled to the first or second channels via the main board 402.

Figure 23:
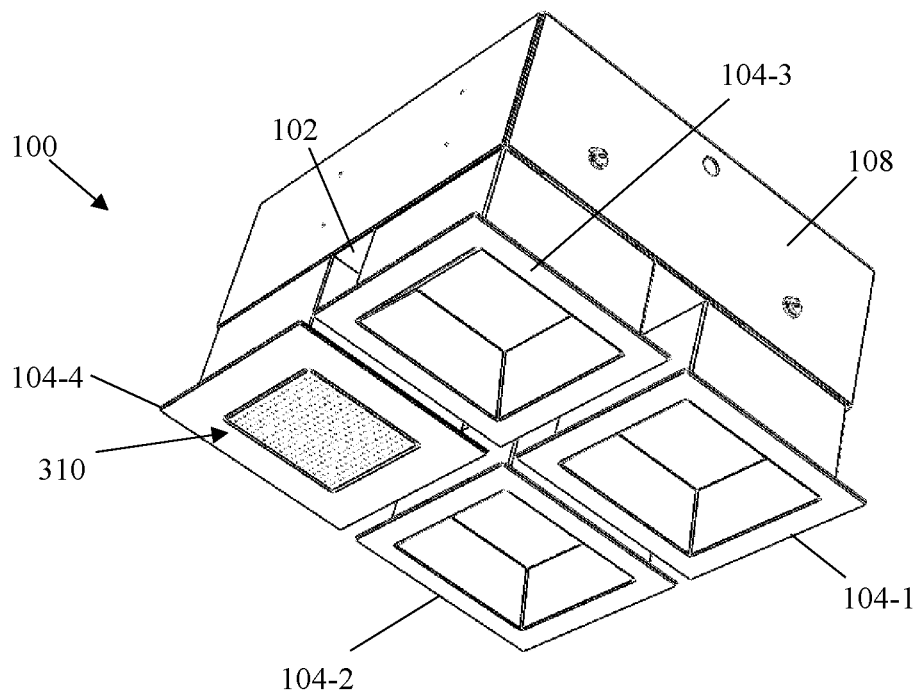
FIG. 23 shows a bottom perspective view of an assembly, in which a speaker insert is installed in one of the modules of the assembly.
Figure 24:
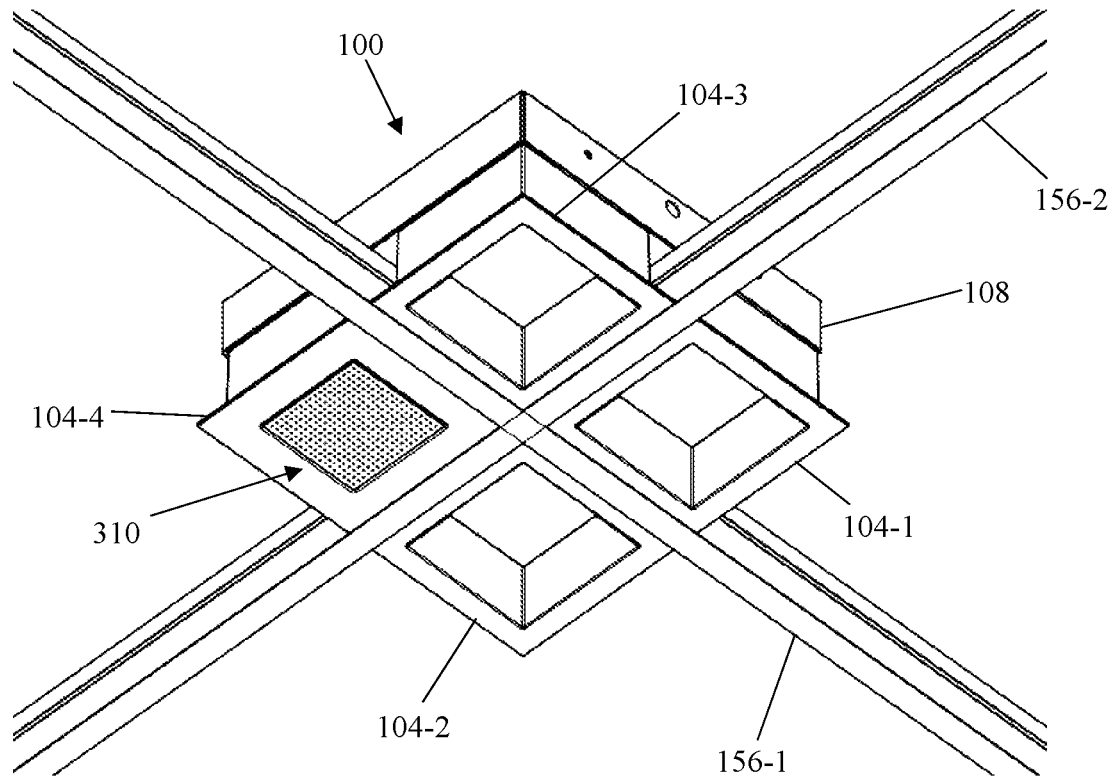
FIG. 24 shows a bottom perspective view of the assembly of FIG. 23 installed in a ceiling grid.
Figure 25:
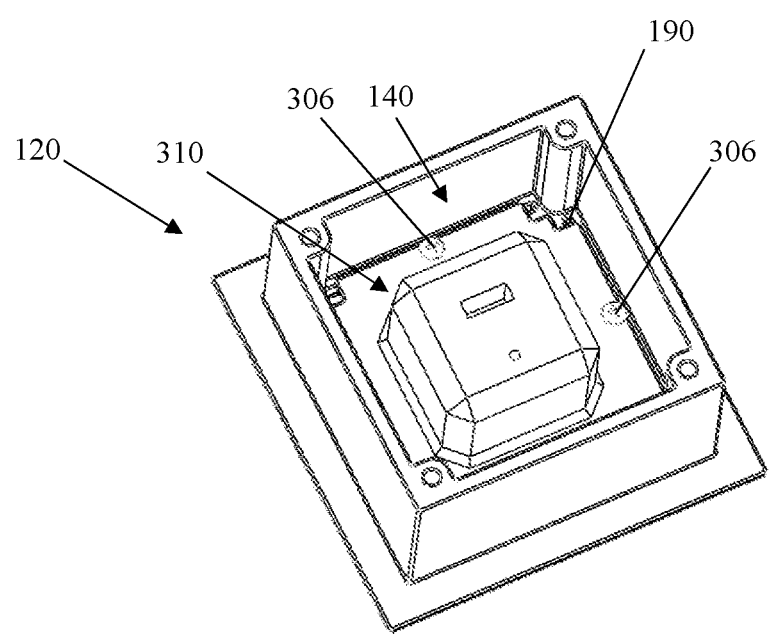
FIG. 25 shows a top perspective view of a speaker insert installed in a module of an assembly.

FIGS. 23-24 show the assembly 100 with a speaker insert 310 that produces sound and is installed in the housing 120 of the module 104-4. FIG. 25 shows a top perspective view of the housing 120 and the speaker insert 310. The speaker insert 310 can be connected to the housing 120 using any of the methods described above with respect to the sensor insert 300.

Figure 26:
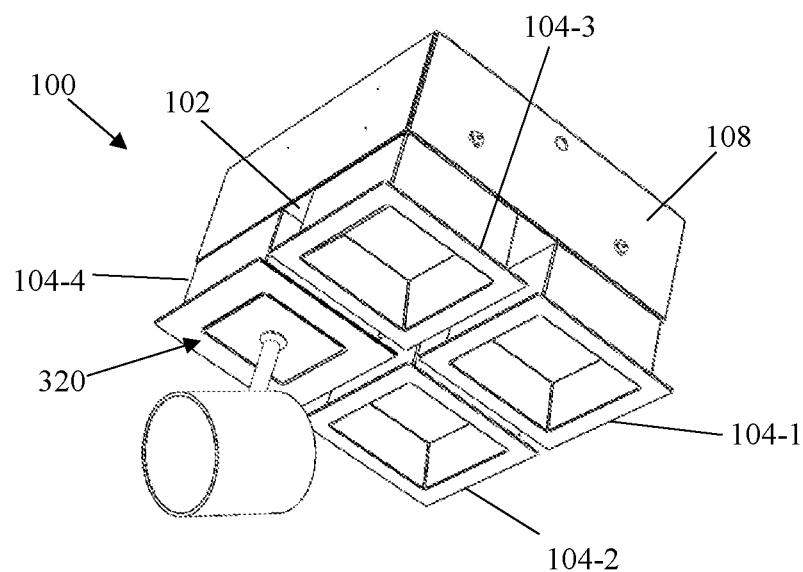
FIG. 26 shows a bottom perspective view of an assembly, in which a spotlight insert is installed in one of the modules of the assembly.
Figure 27:
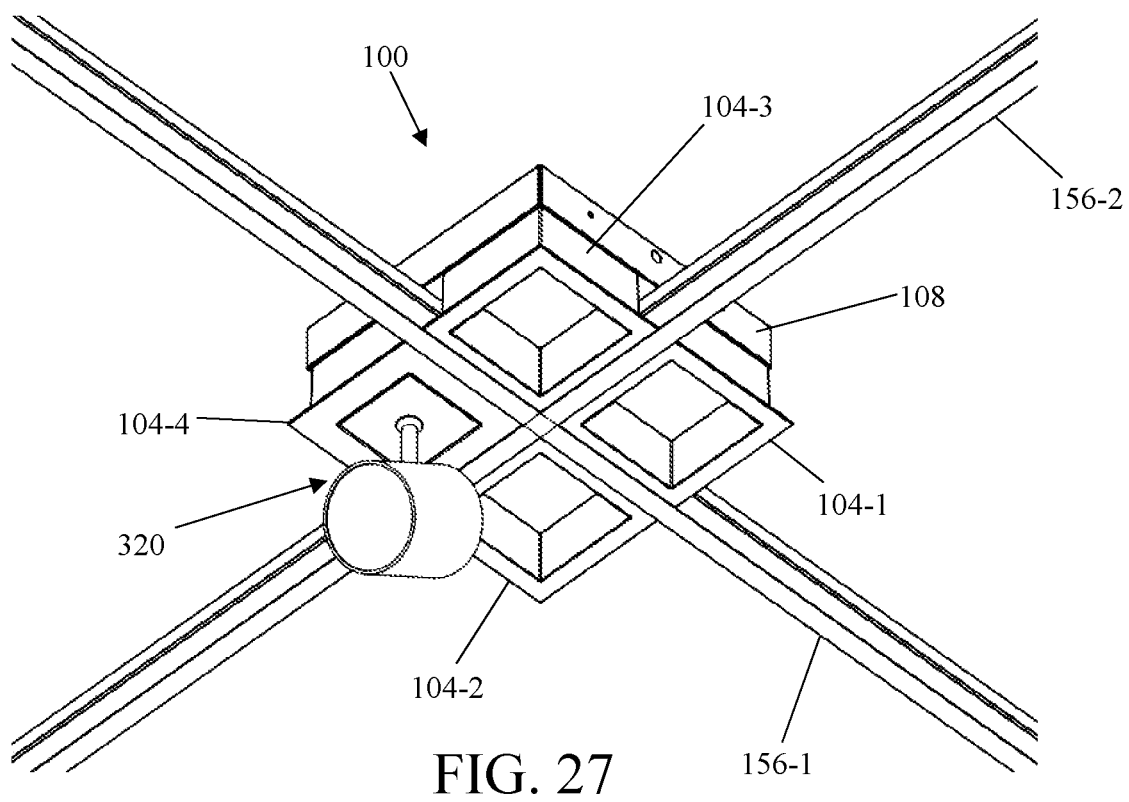
FIG. 27 shows a bottom perspective view of the assembly of FIG. 26 installed in a ceiling grid.
Figure 28:
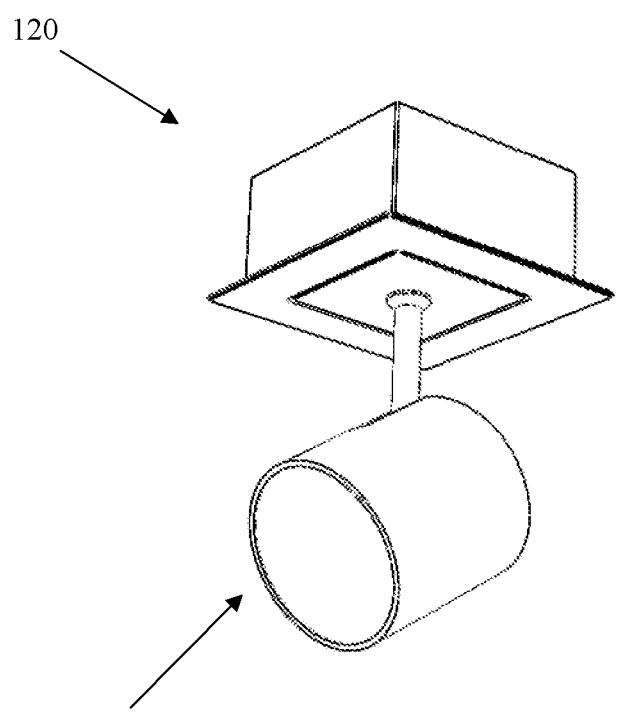
FIG. 28 shows a bottom perspective view of a spotlight insert installed in a module of an assembly.

FIGS. 26 and 27 show the assembly 100 with a spotlight insert 320 installed in the housing 120 of the module 104-4. FIG. 28 shows a bottom perspective view of the housing 120 and the spotlight insert 320. The spotlight insert 320 can be connected to the housing 120 using any of the methods described above with respect to the sensor insert 300. In some cases, the spotlight insert 320 is rotatable and configured to project a beam of light in a specific direction. In some other cases, the assembly 100 includes a drop lens, for example, a thermos-formed lens. In one or more cases, the drop lens may be sized to protrude beyond the surface of the module, such as module 104, such that drop lens is positioned below the horizontal portion of the members 156-1 and 156-2. The drop lens may be formed in a variety of shapes. For example, but not limited to, the drop lens may be cube shaped, cylindrically shaped, conically shaped, or pyramid shaped.

In some embodiments, the assembly 100 includes more than one insert (e.g., the sensor insert 300, speaker insert 310, and spotlight insert 320). In one or more embodiments, the assembly 100 includes a plurality of the same inserts coupled to the base plate 102 via a corresponding module 104. For example, the assembly 100 includes one or more modules that house LEDs. In one or more other embodiments, the assembly 100 includes a combination of inserts coupled to the base plate 102 via the corresponding modules 104. For example, the module 104-1 can include a sensor insert 300, the module 104-2 can include a speaker insert 310, and the module 104-3 can include a spotlight insert 320. Further, modules including the inserts described above (e.g., the sensor insert 300, speaker insert 310, and spotlight insert 320) can be combined in an assembly 100 with modules 104 that include LED light sources as described above (e.g., as shown in FIGS. 6-8B).

In one or more embodiments, the assemblies 100 include modules 104 that include inserts that include WiFi repeaters or boosters. By installing such inserts at various locations within a building, a wireless mesh can be formed to provide internet access throughout a building.

Although the inserts are illustrated as being incorporated in modules with square or rectangular housings. It should be understood that such inserts can also be incorporated into modules having other shapes, for example semi-circular modules, such as those shown in FIG. 14.

Figure 29:
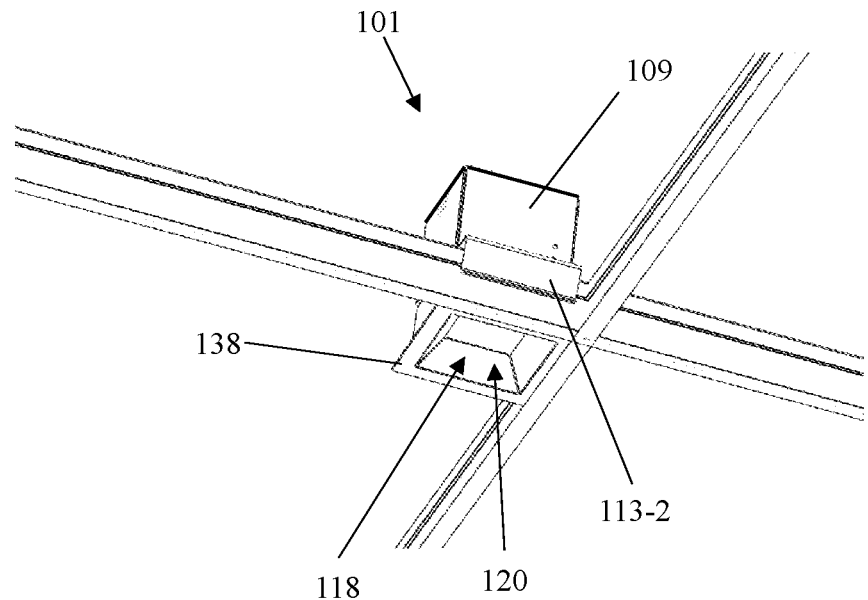
FIG. 29 shows a bottom perspective view of an assembly installed in a ceiling grid, in which a light insert is installed in a module of the assembly.
Figure 30:
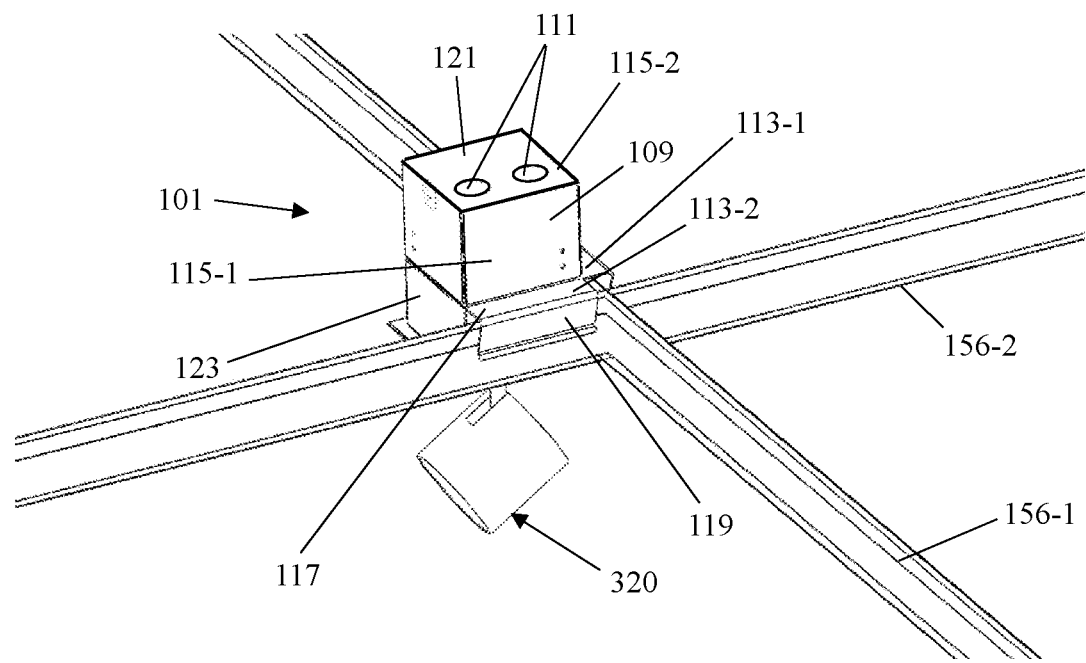
FIG. 30 shows a top perspective view of the assembly of FIG. 29, in which a spotlight insert is installed in a module of the assembly—single housing with spotlight.

In one or more embodiments, an assembly 101 (as shown in FIGS. 29 and 30) is provided to couple one module 104 to the ceiling grid. The assembly 101 includes a housing 109 having one or more mounting arms, such as mounting arms 113-1 and 113-2. In one or more embodiments, the mounting arm may be shaped to be coupled with a member of the ceiling grid. For example, the mounting arm may be formed having a flanged end. The mounting arm, such as mounting arm 113-1, includes a horizontal planar surface 117 that extends outwards from a face 115-1 of the housing 109 and an angled surface 119 on a distal end of the horizontal planar surface 117. The right angled surface 119 is angled downwards away from a rear surface 121 of the housing 109. In one or more embodiments, the mounting arm may be positioned over a member of the ceiling grid. For instance, the mounting arm 113-2 may be positioned over the second member 156-2, and the mounting arm 113-1 may be positioned over the first member 156-1, thereby preventing movement of the assembly 100 transverse to the first member 156-1 and/or the second member 156-2.

In one or more embodiments, a module 123 may be integrally formed with the housing 109, such that the module 123 and the housing 109 have a unibody construction. In one or more other embodiments, the module 123 may be removably coupled with the housing 109 in a same or similar manner as described herein with respect to the module 104 being removably coupled to the base plate 102 and the cover 108 and the assembly 100. The housing 109 may include one or more access portions 111 to allow access to the electrical portions for service and/or to allow wires to pass from the inserts within the assembly 101 to an area outside of the assembly 101. It is noted that the module 123 includes the same or similar features as module 104. For instance, the module 123 may receive and house an insert in a same or similar manner as described with respect to the module 104.

For example, the module 123 may house a light source 118, as shown in FIG. 29. In another example, the module 123 may house a spotlight insert 320, as shown in FIG. 30.

Figure 15:
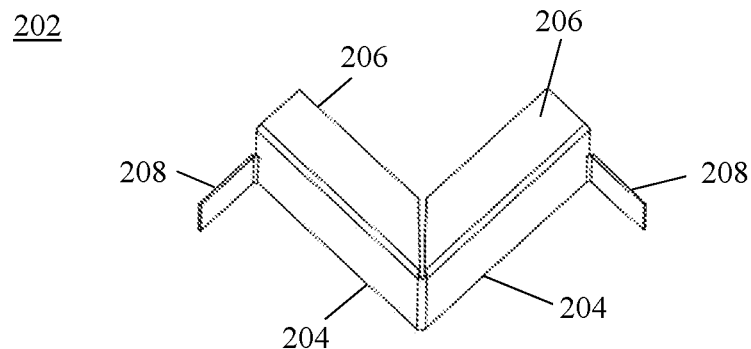
FIG. 15 shows a perspective view of a cutting tool.

In one or more embodiments, a kit includes an assembly 100 as previously described and a cutting tool 202 shown in FIG. 15. The cutting tool 202 is configured to create a recess in a ceiling tile that conforms to the housing 120 of the module 104. The cutting tool 202 can be configured to correspond to various housing 120 geometries without changing how the cutting tool 202 operates. For example, the cutting tool 202 can be configured to create a square cut to correspond to the square modules shown, for example, in FIGS. 1-4 or the cutting tool 202 can create a semi-circular cut to correspond to the quarter-round style modules shown in FIG. 14. The cutting tool 202 allows for easier installation by creating a clean cut in the ceiling tile to avoid breaking or wasting ceiling tiles.

Figure 16:
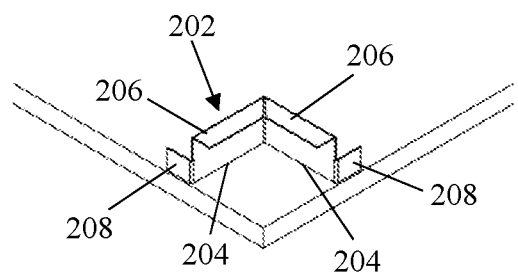
FIG. 16 shows a perspective view of the cutting tool of FIG. 15 positioned to cut a ceiling tile.
Figure 17:
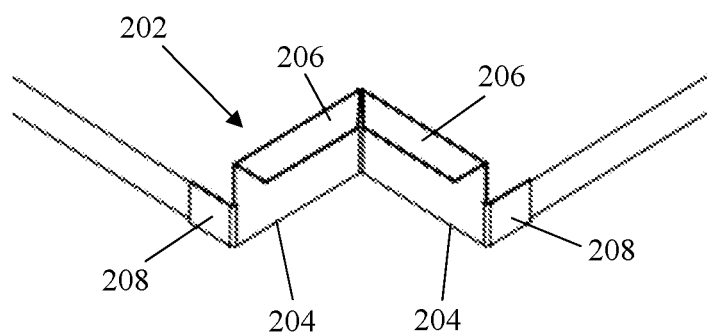
FIG. 17 shows a perspective view of the cutting tool after cutting the ceiling tile.

As shown in FIG. 15, the cutting tool includes cutting edges 204, top flanges 206, and alignment flanges 208. In use, the cutting tool 202 is positioned such that the cutting edges 204 rest against a top face of the ceiling tile and the alignment flanges 208 are parallel to the respective edges of the tile and just outside of the side faces of the tile, as shown in FIG. 16. The user then applies pressure to the top flanges 206 to press the cutting tool 202 downward to cut the tile. As the cutting tool 202 moves downward, the alignment flanges 208 slide along the side faces of the tile. When the cutting tool 202 has cut completely through the tile, the corner of the tile can be removed, as shown in FIG. 17.

The cutting tool 202 can be formed from any appropriate material that is sufficiently rigid such that it can form a cutting edge. For example, the cutting tool 202 can be formed from metal, plastic, or composite material.

In one or more embodiments, a method of assembling the assembly 100 is provided. The method includes the step of attaching a first module 104-1 to the base plate 102. In one or more other embodiments, the method further includes attaching an additional module, such as a second module 104-2, to the base plate 102. When mounted to the base plate 102, the respective housings 120 of the first module 104-1 and the second module 104-2 are spaced from one another at least the width of the vertical portion of a T-bar ceiling grid member.

In one or more other embodiments, the method further includes coupling a third module 104-3 to the base plate 102. When coupled to the base plate 102, the housing 120 of the third module 104-1 is spaced apart from the housing 120 of the first module 104-1 a distance that is at least as large as the width of the vertical portion of a T-bar ceiling grid member (as shown, for example, in FIG. 3).

In one or more other embodiments, the method further includes coupling a fourth module 104-4 to the base plate 102. When coupled to the base plate 102, the housing 120 of the fourth module 104-4 is spaced apart from the housing 120 of the first module 104-1 a distance that is at least as large as the width of the vertical portion of a T-bar ceiling grid member. In addition, the face of the housing 120 of the fourth module 104-4 that faces the third module 104-3 is spaced apart from the third module 104-3 a distance that is at least as large as the width of the vertical portion of a T-bar ceiling grid member. This is shown, for example, in FIG. 3.

The steps of coupling the modules 104 to the base plate 102 may include attaching the modules 104 to the attachment elements 106 of the base plate 102. In one or more embodiments, coupling the modules 104 to the base plate 102 includes installing threaded fasteners through holes 112 of the base plate 102 and engaging the fasteners with threaded bores 136 of the housing 120 of the module 104.

The method may further include installing one or more electrical components. For example, the method includes coupling an LED driver 155 to the base plate 102 on a side of the base plate opposite the modules 104.

The method may further include coupling the cover 108 to the base plate 102 such that the electrical components are disposed between the base plate 102 and the cover 108. The step of coupling the cover 108 to the base plate 102 may include using one or more screws to couple the base plate 102 and the cover 108.

In one or more embodiments, a method of installing the assembly 100 is provided. The method includes mounting the assembly 100 to a ceiling grid. The assembly 100 may be mounted such that the base plate 102 is positioned above an intersection of a first member 156-1 and a second member 156-2 of the ceiling grid. As described above, the assembly may include any number of modules 104. For example, the assembly 100 includes one module 104 (as shown in FIGS. 31 and 32). When the assembly 100 is installed, the housing 120 of each module 104 extends downward from the base plate 102 toward the horizontal portion 160 of the first 156-1 and second 156-2 members of the ceiling grid. In various embodiments, the flange 138 of the housing 120 contacts the horizontal portion 160 of the first member 156-1 and/or the second member 156-2.

In various embodiments, the assembly 100 includes at least two modules 104 and the assembly 100 is mounted such that the first module 104-1 is on a first side of the first member 156-1 of the ceiling grid and the second module 104-2 is on a second side of the first member 156-1 of the ceiling grid. As described above, the assembly 100 may include any number of modules, for example four modules as shown in FIG. 3 and described above. Each of the modules 104 may be positioned in a respective quadrant of the ceiling grid defined by the intersection of the first member 156-1 and the second member 156-2 of the ceiling grid. Mounting the assembly 100 to the grid may include coupling a mounting bracket 166 to one or more members 156 of the grid.

The method of installation may further include using the cutting tool 202 to cut one or more ceiling tiles 174 to remove a section of the ceiling tile 174. The cutting tool 202 is configured to remove a section of the ceiling tile 174 that corresponds to the shape of the module housing 120.

The method of installation may further include installing the cut ceiling tile 174 such that the ceiling tile 174 is supported by horizontal portions 160 of the members 156 of the ceiling grid. In one embodiment, the ceiling tile 174 is also supported by the flange 138 on the housing 120 of the module 104. Hence, when installed the assembly appears to be integrated into the ceiling grid.

The method of installation may further include electrically coupling one or more electrical components (e.g., LED driver 155, sensor insert 300, speaker insert 310, spotlight insert 320, etc.) of the assembly 100 to a main power source.

In various embodiments, the method of installation may include coupling the modules 104 to the base plate. The module 104 may be coupled to the base plate 102 in any appropriate manner. For example, the modules 104 may be coupled to the base plate 102 using screws, bolts, or other threaded fasteners, as described above. In other embodiments (not shown), the base plate and modules are coupled with clips.

In other embodiments, the assembly 100 is provided with the maximum number of modules 104 pre-attached. In such embodiments, the method of installing the assembly 100 may include removing one or more modules 104 that are not required for the particular installation. This may include removing one or more fasteners coupling the respective module 104 to the base plate 102.

Figure 35:
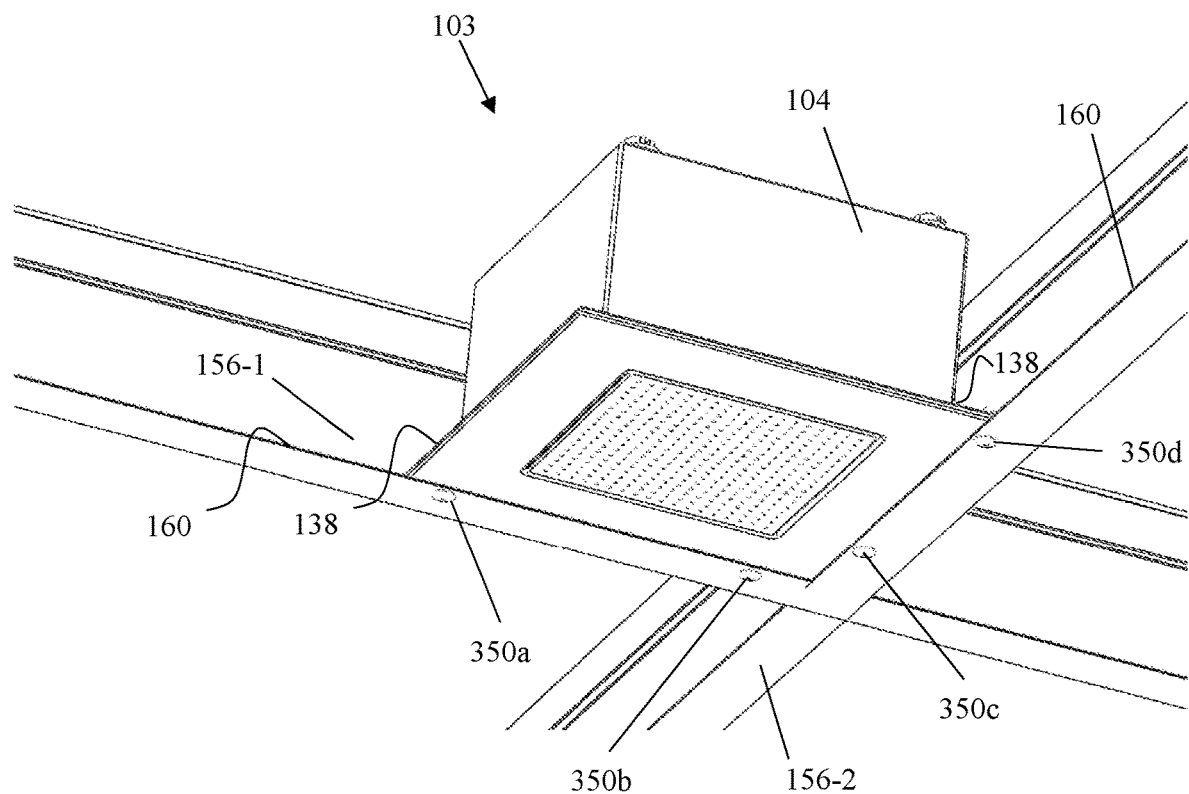
FIG. 35 illustrates an assembly coupled to the ceiling grid.
Figure 36:
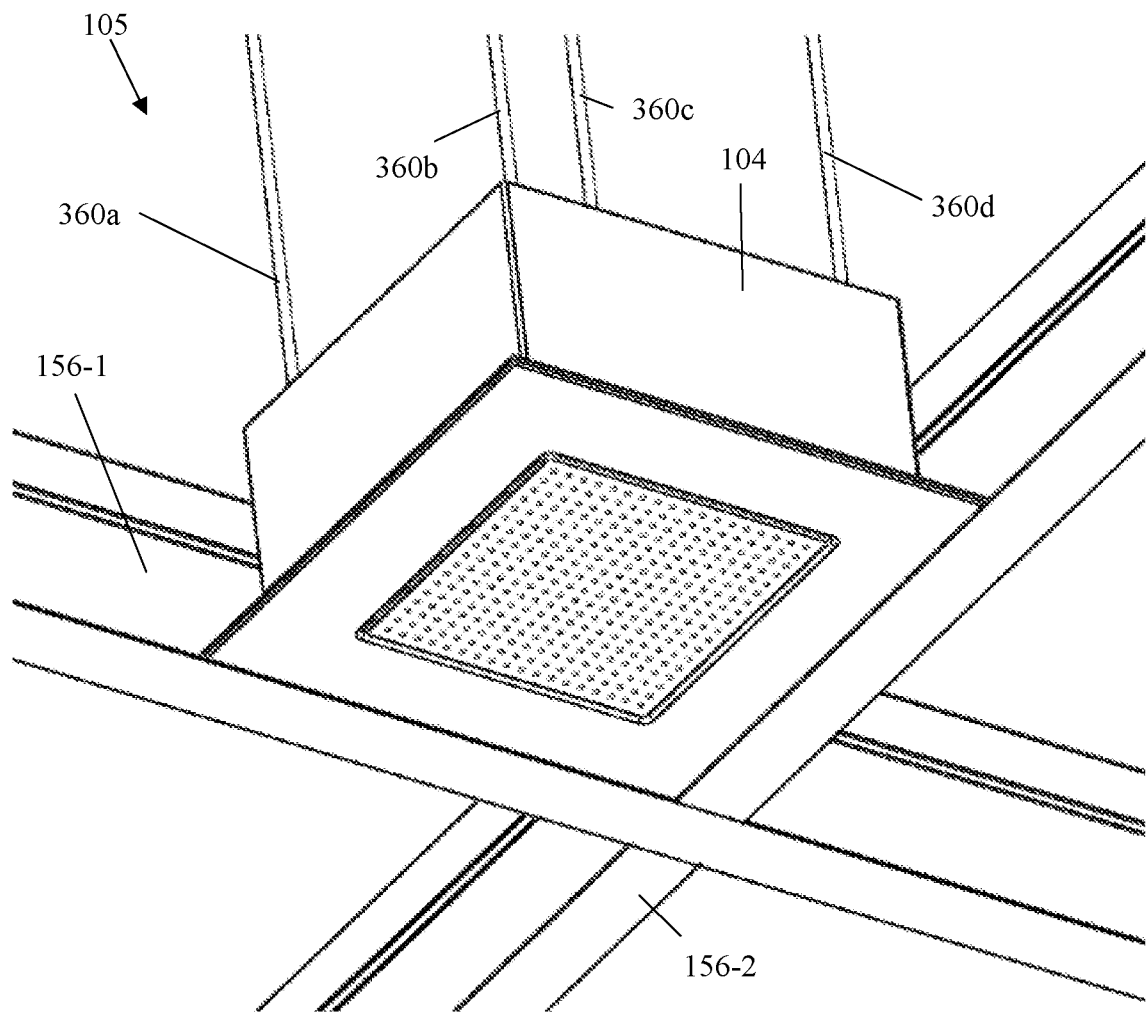
FIG. 36 illustrates an assembly coupled to the ceiling grid.
Figure 37:
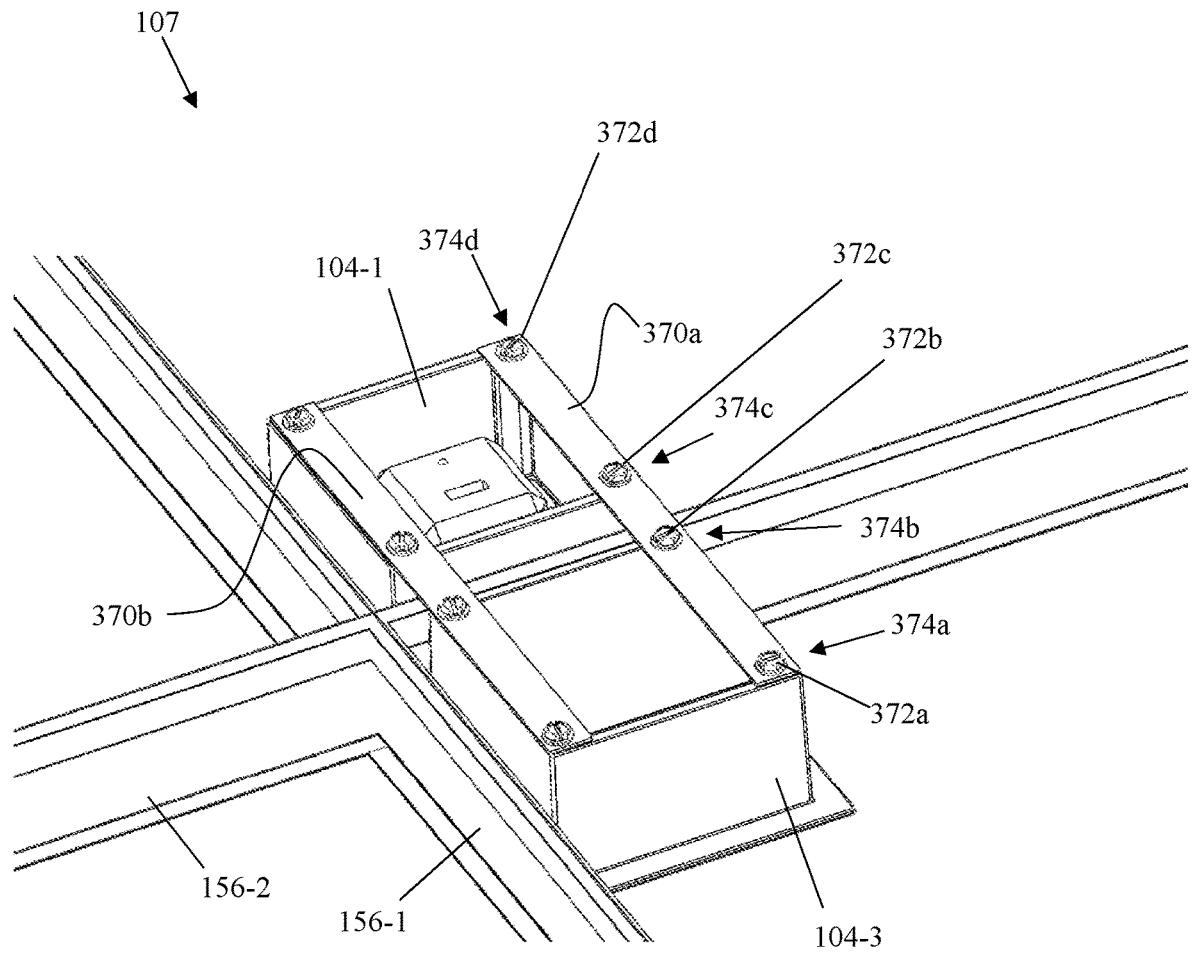
FIG. 37 illustrates an assembly coupled to the ceiling grid.

In one or more other embodiments, as illustrated in FIGS. 35-37, one or more modules, such as module 104, may be coupled to the ceiling grid in a variety of manners, alternative to those discussed with respect to assembly 100 and 101.

As illustrated in FIG. 35, the module 104 of assembly 103 may be coupled to the ceiling grid by fastening the module 104 directly to a portion of the ceiling grid. In an example, to couple the module 104 to the ceiling grid, one or more of the flanges 138 of the module 104 may be coupled to a respective horizontal portion 160 of the first member 156-1 and the second member 156-2. In some instances, a flange 138 and a respective horizontal portion 160 may each include one or more holes aligned to receive a fastener (e.g., screw, nut and bolt, and the like), such as fasteners 350*a* and 350*b*, therein. The fasteners 350*a* and 350*b* may fasten the flange 138 to the member of the ceiling grid. In other instances, the flange 138 and the horizontal portion 160 may be fastened together via other means, such as riveting, welding, bonding with an adhesive, securing with Velcro, and other like means.

As illustrated in FIG. 36, the module 104 of the assembly 105 may be coupled to the ceiling grid by suspending the module 104 to the ceiling, via one or more suspension cables 360, such as suspension cables 360*a*, 360*b*, 360*c*, and 360*d*. In one or more cases, one end of the suspension cable 360 may be coupled to a portion of the ceiling via a fastener, and an opposite end of the suspension cable 360 may be coupled to a portion on the rear surface of the housing 120. For instance, the end of the suspension cable 360 may include a fastener configured to engage with a threaded bore 136 (shown in FIG. 7) of the housing 120. In other instances, the end of the suspension cable 360 may be coupled to the rear surface of the housing 120, via welding or bonding the suspension cable 360 to the housing 120. In one or more cases, the suspension cable may be a rope of metal wire or non-metallic fibers, chain, or the like. In one or more other cases, the suspension cable may be an elongated rigid material, such as a metal bracket.

In one or more cases, to install the assembly 105, the module 104 may be placed on a portion of the ceiling grid, such that one or more flanges rest on a respective horizontal portion 160 of the first member 156-1 and 156-2, and the ends of the suspension cable 360 may be coupled to the ceiling and the module 104, respectively. In some cases, the suspension cable may be pre-attached to the module 104. In some cases, the length of the suspension cable may cut to accommodate the distance from the ceiling to the module 104. The cut ceiling tile 174 may be installed such that the ceiling tile 174 is supported by the horizontal portions 160 of the members 156. In one or more other cases, to install the assembly 105 in an inner portion of the ceiling tile 174, a portion of the ceiling tile 174 may be cut out (e.g., in a square shape) to receive the outer walls of the housing therein. The cut-out portion of the ceiling tile 174 may be located in the inner portion of the ceiling tile 174 away from the edges of the ceiling tile 174. The cut ceiling tile 174 may be installed in the ceiling grid such that the ends of the ceiling tile are supported by the horizontal portions 160 of the members 156. One or more suspension cables 360 may be fastened to the ceiling, and the opposite ends of the suspension cables 360 may be fastened to the module 104.

The end of the suspension cable 360 may be fastened to the ceiling before or after installing the ceiling tile. The module 104 may be inserted into the cut-out portion of the ceiling tile 174. The length of the suspension cables 360 may be adjusted, such that the flanges 138 of the module 104 rest flush on the outer surface of the cut portion (e.g., the square shaped cut-out) of the ceiling tile 174. Hence, when installed, the assembly 105 appears to be integrated into the ceiling tile 174. Moreover, the assembly 105 may be integrated into any portion of the ceiling tile 174 (e.g., in a center of the ceiling tile 174) and does not need to be supported by one or more portions (e.g., horizontal portion 160) of the members 156.

As illustrated in FIG. 37, a plurality of modules, such as module 104-1 and 104-3, of the assembly 107 may be coupled together via one or more brackets, such as bracket 370*a* and 370*b*. The bracket 370 may be an elongated rigid member that extends from a portion of one module to a portion of another module. For instance, the bracket 370 may extend from an end 374*a* of module 104-3 to an end 374*d* of module 104-1. The bracket 370 may be made out or metal, plastic, or other like rigid materials. The bracket 370 may include one or more through holes, which align with at least one threaded bore 136 of one module and at least one threaded bore 136 of the other module, and are configured to receive a fastener therein. For instance, the bracket 370 may include four through holes, each configured to align with a respective threaded bore 136 and receive a respective fastener, such as fasteners 372*a*, 372*b*, 372*c*, and 372*d*. By fastening the fasteners 372 to the bracket 370 and the modules 104-1 and 104-3, the modules 104-1 and 104-3 may be fastened together. Moreover, by fastening the modules 104-1 and 104-3 around a member, such as member 156-2, of the ceiling grid, the modules 104-1 and 104-3 may be prevented from moving in a direction perpendicular to the member 156-2 or in a direction parallel with the member 156-1.

It is noted that FIG. 37 illustrates module 104-1 and module 104-3 coupled together via brackets 370*a* and 370*b*. However, it should be understood that module 104-1 and module 104-2 may be coupled together via one bracket or more than two brackets. It should also be understood that additional brackets may be used to fasten additional modules (e.g., module 104-2 and module 104-4) together. For instance, one bracket may couple module 104-1 and module 104-2 together, another bracket may couple module 104-1 and module 104-3 together, another bracket may couple module 104-2 and module 104-4 together, and another bracket may couple module 104-3 and module 104-4 together.

It is noted that module 104 may include spring clips coupled to one or more faces, such as the face 115-1, of the housing 109, such that the module 104 may be installed into a hard ceiling, for example, one that includes drywall.

As used herein, the term "about" in reference to a numerical value means the numerical value of the number with which it is being used or a value ranging plus or minus 15% of the numerical value of the number with which it is being used.

While the foregoing description and drawings represent preferred or exemplary embodiments, it will be understood that various additions, modifications and substitutions may be made therein without departing from the spirit and scope and range of equivalents of the accompanying claims. In particular, it will be clear to those skilled in the art that the preferred or exemplary embodiments may be embodied in other forms, structures, arrangements, proportions, sizes, and with other elements, materials, and components, without departing from the spirit or essential characteristics thereof. In addition, numerous variations in the methods/processes described herein may be made without departing from the spirit of the disclosure. One skilled in the art will further appreciate that the preferred or exemplary embodiments may be used with many modifications of structure, arrangement, proportions, sizes, materials, and components and otherwise, used in the practice of the preferred or exemplary embodiments, which are particularly adapted to specific environments and operative requirements without departing from the principles of the present disclosure. The presently disclosed embodiments are therefore to be considered in all respects as illustrative and not restrictive, the scope of the disclosure being defined by the appended claims and equivalents thereof, and not limited to the foregoing description or embodiments. Rather, the appended claims should be construed broadly, to include other variants and embodiments, which may be made by those skilled in the art without departing from the scope and range of equivalents of the embodiments. All patents and published patent applications identified herein are incorporated herein by reference in their entireties.

What is claimed is:

1. An assembly comprising:
a base plate; and
a first accessory housing coupled to the base plate, the first accessory housing defining a chamber to receive an accessory insert therein, the first accessory housing comprising a first end adjacent the base plate and a second end spaced apart from the first end, a first wall and a second wall of the chamber extending between the first end and the second end, wherein
the second end defines an opening of the chamber to receive the accessory insert,
the assembly is configured to be coupled to a ceiling grid such that the first accessory housing is positioned above horizontal portions of intersecting members of the ceiling grid, the intersecting members each having a t-shape comprising a horizontal portion and a vertical portion extending along a length of the respective member,
the second end of the first accessory housing comprises a first flange extending outwards from the first wall and a second flange extending outwards from the second wall, and
the first flange and the second flange are adjacent to one another.

2. The assembly of claim 1, wherein the first flange and the second flange are configured to be mounted at an intersection of the intersecting members.

3. The assembly of claim 1, wherein the first flange and the second flange are configured to support a ceiling tile.

4. The assembly of claim 1, wherein the accessory insert comprises a sensor mounted to a plate, the plate configured to be coupled to the second end.

5. The assembly of claim 1, wherein the accessory insert comprises a speaker mounted to a plate, the plate configured to be coupled to the second end.

6. The assembly of claim 1, wherein the accessory insert comprises a lighting fixture mounted to a plate, the plate configured to be coupled to the second end.

7. The assembly of claim 1, wherein the first end of the first accessory housing defines at least one opening sized to access the chamber.

8. The assembly of claim 1, wherein:
the base plate comprises a plurality of accessory housing attachment elements;
at least one of the plurality of accessory housing attachment elements is configured to align with a quadrant defined by the intersecting members when the assembly is coupled to the ceiling grid; and
the first accessory housing is coupled to one of the plurality of accessory housing attachment elements.

9. The assembly of claim 1, further comprising a second accessory housing coupled to the base plate,
wherein the second accessory housing:
defines a second chamber to receive another accessory insert therein,
comprises a third end adjacent the base plate and a fourth end spaced apart from the third end, a third wall and fourth wall of the second chamber extending between the third end and the fourth end, and
defines a second opening of the second chamber to receive the second accessory insert; and
wherein, when the assembly is coupled to the ceiling grid, the first accessory housing and the second accessory housing are positioned on opposite sides of the vertical portion of one of the intersecting members.

10. The assembly of claim 9, wherein:
the accessory insert comprises one of a sensor, speaker, or lighting fixture mounted to a first plate, the first plate coupled to the second end of the first accessory housing, and
the second accessory insert comprises one of another sensor, speaker, or lighting fixture mounted to a second plate, the second plate coupled to the fourth end of the second accessory housing.

11. A ceiling assembly comprising:
a ceiling grid comprising:
a first member having a vertical portion and a horizontal portion extending along a length of the first member; and
a second member having a vertical portion and a horizontal portion extending along a length of the second member;
an accessory assembly comprising:
a base plate; and
a first accessory housing coupled to the base plate, the first accessory housing defining a chamber to receive an accessory insert therein, the first accessory housing comprising a first end adjacent the base plate and a second end spaced apart from the first end, a first wall and second wall of the chamber extending between the first end and the second end, and the second end defining an opening of the chamber to receive the accessory insert; and
at least one ceiling tile supported by the horizontal portions of the first member and the second member and by the second end of the first accessory housing, wherein
the accessory assembly is configured to be coupled to the ceiling grid such that the first accessory housing is positioned above the horizontal portions of the first and second members;
the second end of the first accessory housing comprises a first flange extending outwards from the first wall and a second flange extending outwards from the second wall, and
the first flange and the second flange are adjacent to one another.

12. The ceiling assembly of claim 11, wherein the accessory insert comprises one of a sensor, speaker, or lighting fixture mounted to a first plate, the first plate coupled to the second end of the first accessory housing.

13. The ceiling assembly of claim 11, wherein the first end of the first accessory housing defines at least one opening sized to access the chamber.

14. The ceiling assembly of claim 11, wherein the accessory assembly further comprises a second accessory housing coupled to the base plate,
   wherein the second accessory housing:
      defines a second chamber to receive another accessory insert therein,
      comprises a third end adjacent the base plate and a fourth end spaced apart from the third end, a third wall and fourth wall of the second chamber extending between the third end and the fourth end, and
      defines a second opening of the second chamber to receive the second accessory insert; and
   wherein, when the accessory assembly is coupled to the ceiling grid, the first accessory housing and the second accessory housing are positioned on opposite sides of the vertical portion of the first member of the ceiling grid.

15. The ceiling assembly of claim 11, wherein:
   the accessory insert comprises one of a sensor, speaker, or lighting fixture mounted to a first plate, the first plate coupled to the second end of the first accessory housing, and
   the second accessory insert comprises one of another sensor, speaker, or lighting fixture mounted to a second plate, the second plate coupled to the fourth end of the second accessory housing.

16. An accessory assembly comprising: a housing defining a chamber to receive an accessory insert therein, the housing comprising a first wall and a second wall disposed between a first end and a second end, wherein the second end defines an opening of the chamber to receive the accessory insert, and wherein the second end comprises a first mounting arm extending from the first wall and a second mounting arm extending from the second wall, the first mounting arm and the second mounting arm each being shaped to extend over and couple to vertical portions of respective members of a ceiling grid, and wherein the first mounting arm and the second mounting arm are configured to be mounted to the vertical portions of two intersecting members of the ceiling grid.

17. The accessory assembly of claim 16, wherein the accessory insert comprises one of a sensor, speaker, or lighting fixture mounted to a plate, the plate coupled to the second end of the housing.

* * * * *